(12) United States Patent
Liu

(10) Patent No.: US 10,773,360 B2
(45) Date of Patent: Sep. 15, 2020

(54) SYSTEMS AND METHODS FOR MAKING ABRASIVE ARTICLES

(71) Applicant: 3M INNOVATIVE PROPERTIES COMPANY, St. Paul, MN (US)

(72) Inventor: Yuyang Liu, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 50 days.

(21) Appl. No.: 15/735,533

(22) PCT Filed: Jul. 1, 2016

(86) PCT No.: PCT/US2016/040726
§ 371 (c)(1),
(2) Date: Dec. 11, 2017

(87) PCT Pub. No.: WO2017/007714
PCT Pub. Date: Jan. 12, 2017

(65) Prior Publication Data
US 2018/0169837 A1    Jun. 21, 2018

Related U.S. Application Data

(60) Provisional application No. 62/190,046, filed on Jul. 8, 2015.

(51) Int. Cl.
*B24B 1/00* (2006.01)
*B24D 11/00* (2006.01)
(Continued)

(52) U.S. Cl.
CPC .......... *B24D 11/005* (2013.01); *B24D 11/001* (2013.01); *B24D 18/0072* (2013.01); *C09K 3/1409* (2013.01); *C09K 3/1436* (2013.01)

(58) Field of Classification Search
CPC combination set(s) only.
See application file for complete search history.

(56) References Cited

U.S. PATENT DOCUMENTS

2003/0009949 A1\* 1/2003 Prichard ................ B24D 3/002
51/297
2003/0207659 A1   11/2003 Annen
(Continued)

FOREIGN PATENT DOCUMENTS

| DE | 102013212609 | 12/2014 |
|---|---|---|
| DE | 102013212617 | 12/2014 |

(Continued)

OTHER PUBLICATIONS

International Search Report for PCT/US2016/040726, dated Oct. 18, 2016 (4 pages).

*Primary Examiner* — James E McDonough
(74) *Attorney, Agent, or Firm* — Aleksander Medved

(57) ABSTRACT

Methods of making an abrasive article. Abrasive particles are loaded to a distribution tool defining a plurality of slots that are open to an exterior of the tool. The loaded particles are distributed from the distribution tool to a major face of a backing web below the lower side and moving relative to the tool. Some of the loaded particles become oriented in a respective one of the slots and are then dispensed on to the major face. In this regard, during the step of distributing, a plurality of the oriented particles is simultaneously at least partially within a first slot and in contact with major face. In some embodiments, the distribution tool includes a plurality of aligned rings; adjacent ones of the rings are attached to, and longitudinally separated from, one another by one or more spacer bodies.

11 Claims, 19 Drawing Sheets

(51) Int. Cl.
  *B24D 18/00* (2006.01)
  *B24D 3/00* (2006.01)
  *C09K 3/14* (2006.01)

(56) References Cited

U.S. PATENT DOCUMENTS

| | | |
|---|---|---|
| 2005/0130568 A1 | 6/2005 | Welygan et al. |
| 2006/0288647 A1 | 12/2006 | Thurber |
| 2007/0044384 A1 | 3/2007 | Larson |
| 2008/0102720 A1 | 5/2008 | Rostal |
| 2008/0152856 A1 | 6/2008 | Keipert |
| 2009/0169816 A1 | 7/2009 | Erickson |
| 2009/0325466 A1 | 12/2009 | Kincaid |
| 2010/0146867 A1 | 6/2010 | Boden |
| 2010/0151196 A1 | 6/2010 | Adefris |
| 2010/0319269 A1 | 12/2010 | Erickson |
| 2011/0289854 A1* | 12/2011 | Moren ................ B24D 11/001 51/295 |
| 2012/0227333 A1 | 9/2012 | Adefris |
| 2013/0040537 A1 | 2/2013 | Schwabel |
| 2013/0125477 A1 | 5/2013 | Adefris |
| 2013/0344786 A1 | 12/2013 | Keipert |
| 2014/0000176 A1 | 1/2014 | Moren |
| 2014/0106126 A1* | 4/2014 | Gaeta .................. C09K 3/1409 428/143 |
| 2014/0259961 A1* | 9/2014 | Moren .................. B05D 1/007 51/298 |
| 2014/0290147 A1 | 10/2014 | Seth |
| 2016/0311081 A1 | 10/2016 | Culler et al. |

FOREIGN PATENT DOCUMENTS

| | | | |
|---|---|---|---|
| DE | 102013212684 | 12/2014 | |
| WO | 2001/43918 | 6/2001 | |
| WO | WO-0143918 A2 * | 6/2001 | ............. B24D 11/00 |
| WO | 2010/077519 | 7/2010 | |

* cited by examiner

SYSTEMS AND METHODS FOR MAKING ABRASIVE ARTICLES

CROSS REFERENCE TO RELATED APPLICATIONS

This application is a national stage filing under 35 U.S.C. 371 of PCT/US2016/040726, filed Jul. 1, 2016, which claims the benefit of U.S. Provisional Patent Application No. 62/190,046, filed Jul. 8, 2015, the disclosures of which are incorporated by reference in their entirety herein.

BACKGROUND

The present disclosure relates to abrasive articles. More particularly, it relates to tools, systems and methods for arranging abrasive particles on a backing as part of the manufacture of an abrasive article.

In general, coated abrasive articles have an abrasive layer secured to a backing. The abrasive layer comprises abrasive particles and a binder that secures the abrasive particles to the backing. One common type of coated abrasive article has an abrasive layer comprised of a make coat or layer, a size coat or layer, and abrasive particles. In making such a coated abrasive article, a make layer precursor comprising a curable make resin is applied to a major surface of the backing. Abrasive particles are then at least partially embedded into the curable make resin, and the curable make resin is at least partially cured to adhere the abrasive particles to the major surface of the backing. A size layer precursor comprising a curable size resin is then applied over the at least partially cured curable make resin and abrasive particles, followed by curing of the curable size resin precursor, and optionally further curing of the curable make resin.

Application of the abrasive particles to a major face of a backing construction (e.g., a backing coated with a make layer precursor) is oftentimes accomplished via drop coating technique in which a bulk supply of the abrasive particles are fed through a hopper and fall onto the major face (e.g., onto or into the make layer precursor) under the force of gravity. A spatial orientation of the abrasive particles upon contacting the major face is entirely random in all directions. Alternatively, electrostatic coating (e-coat) is also well known, and generally employs an electrostatic field to propel the abrasive particles vertically against the force of gravity onto the major face (e.g., onto or into the make layer precursor). With electrostatic coating, it is possible to effect the orientation of the abrasive particles in one direction such that each abrasive particle's elongated dimension is substantially erect (standing up) with respect to the backing surface. Rotational orientation about the major axis remains random. Electrostatic coating is more complex than drop coating, and may not be viable with all types of abrasive particles (e.g., it can be difficult to consistently electrostatically coat relatively large abrasive particles).

In light of the above, a need exists for improved systems and methods for applying abrasive particles to a backing construction as part of the manufacture of an abrasive article.

SUMMARY

Some aspects of the present disclosure are directed toward methods of making abrasive articles. The method includes loading abrasive particles to a distribution tool. The distribution tool defines a plurality of slots that are open to an exterior of the distribution tool. The abrasive particles are distributed from the distribution tool on to a major face of a backing construction web located immediately below the distribution tool. The distribution of abrasive particles includes rotating the distribution tool and moving the backing construction web relative to the distribution tool. At least some of the loaded abrasive particles are oriented in a respective one of the slots. The oriented abrasive particles are dispensed on to the major face. In this regard, during the step of distributing, a plurality of the oriented abrasive particles is simultaneously at least partially within a first one of the slots and in contact with the major face. With these techniques, a multiplicity of abrasive particles can quickly and easily be applied to a backing with controlled orientation and alignment. In some embodiments, during the step of distributing, at a single point in time, a plurality of the abrasive particles are in each of the slots, and each of the slots simultaneously maintains the respective plurality in contact with the major face. In other embodiments, the distribution tool is a ring-shaped cylinder defining an open central bore, with the step of loading including continuously feeding abrasive particles into the central bore.

Yet other aspects of the present disclosure are directed toward a system for making an abrasive article. The system includes a distribution tool and a web feeding device. The distribution tool has a cylindrical shape and defines a plurality of slots. Each of the slots has a length greater than a width and a depth. The slots are open to an exterior of the distribution tool. Further, a length of each of the slots is arranged in a circumferential direction of the cylindrical shape. The web feeding device is configured to move a backing construction web immediately below the distribution tool. In some embodiments, the distribution tool includes a plurality of aligned rings; in related embodiments, immediately adjacent ones of the rings are attached to, and longitudinally separated from, one another by one or more spacer bodies.

DETAILED DESCRIPTION

Figure 1:
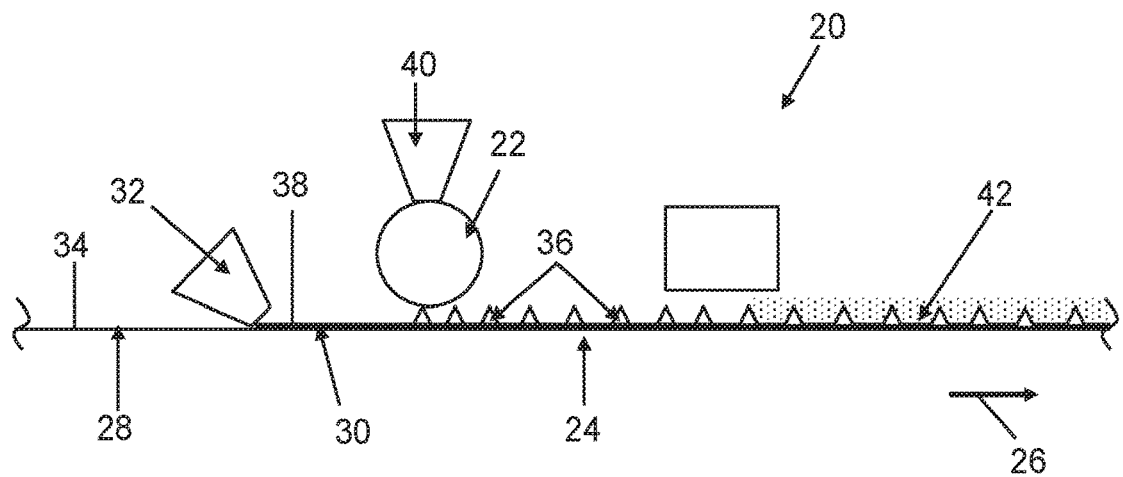
FIG. 1 is a simplified illustration of a portion of a system for manufacturing abrasive articles in accordance with principles of the present disclosure.

Aspects of the present disclosure relate to tools, systems and methods for manufacturing abrasive articles, and in particular devices and methods for applying abrasive particles to a backing construction. As a point of reference, FIG. 1 illustrates portions of a system 20 for manufacturing abrasive articles in accordance with principles of the present disclosure, including a distribution device 22 along with other components or devices commonly employed in the manufacture of abrasive articles. For example, the manufacture of abrasive articles conventionally includes structures and mechanisms (e.g., rollers, conveyor belts, etc.) for moving a backing construction web 24 along a path of travel or machine direction 26. The backing construction web 24 can assume various forms, and in some embodiments includes a backing 28 to which a make coat precursor resin 30 (or other resin or adhesive) has been applied. For example, with the non-limiting arrangement of FIG. 1, the backing 28 is advanced past a coater 32 that applies the make coat precursor resin 30 on a major surface 34 of the backing 28 thereby creating the backing construction web 24 (e.g., a coated backing). In other embodiments, multiple coatings can be applied to the backing 28 to generate the backing construction web 24 as delivered to the distribution tool 22; in yet other embodiments, the backing construction web 24 consists of the backing 28 alone (i.e., prior to interacting with the distribution device 22, the backing 28 is not subjected to a resin coating operation). Abrasive particles 36 (a size of which is exaggerated in FIG. 1 for ease of understanding) are applied to a major face 38 of the backing construction web 24 by the distribution device 22 that otherwise distributes the abrasive particles 36 from a source 40 as described below. After application of the abrasive particles 36, the backing construction web 24 exits the distribution device 22 and is optionally subjected to further processing (e.g., application of a size coat 42, application of additional abrasive particles by conventional means (e.g., e-coat), application of a grinding aid, application of a supersize coat, curing, cutting, etc.) to produce a final abrasive article, such as a coated abrasive article.

Figure 2A:
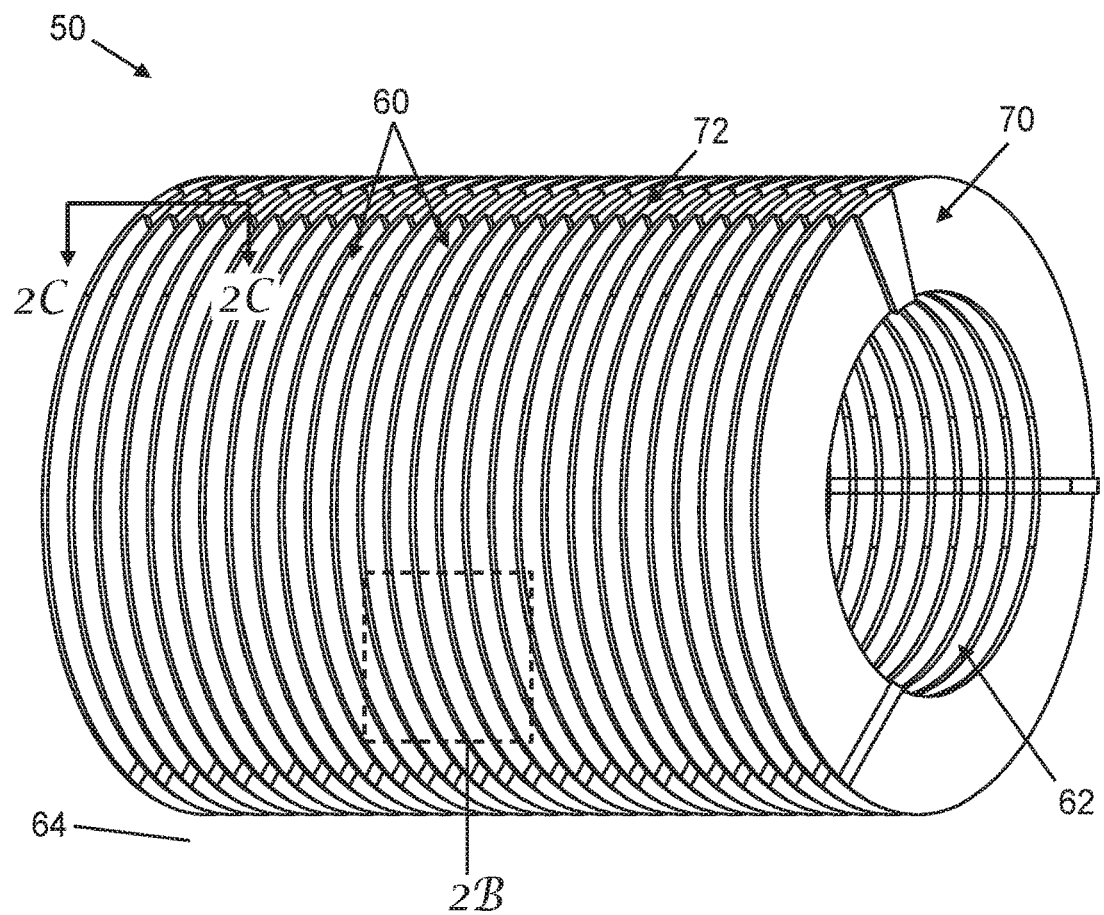
FIG. 2A is a simplified perspective view of a distribution tool in accordance with principles of the present disclosure and useful with the system of FIG. 1.
Figure 2B:
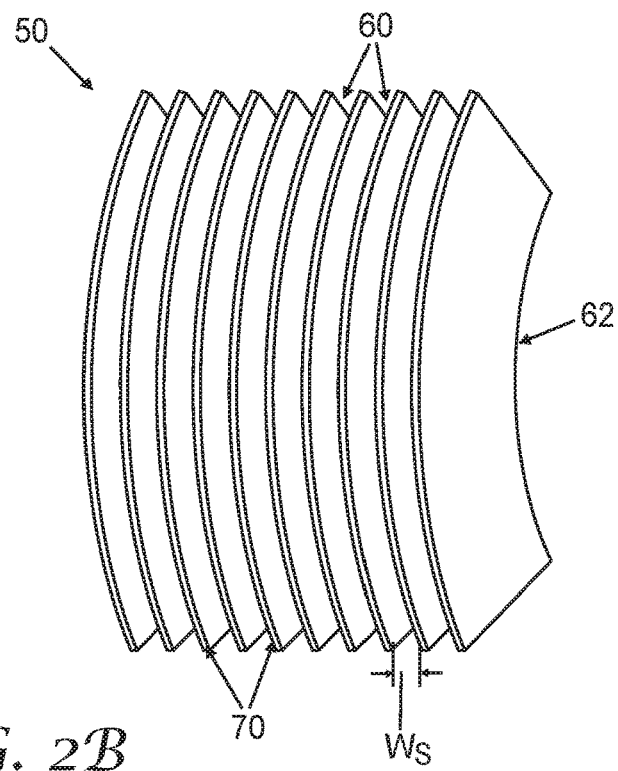
FIG. 2B is an enlarged perspective view of a portion of the tool of FIG. 2A taken along the line 2B.
Figure 2C:
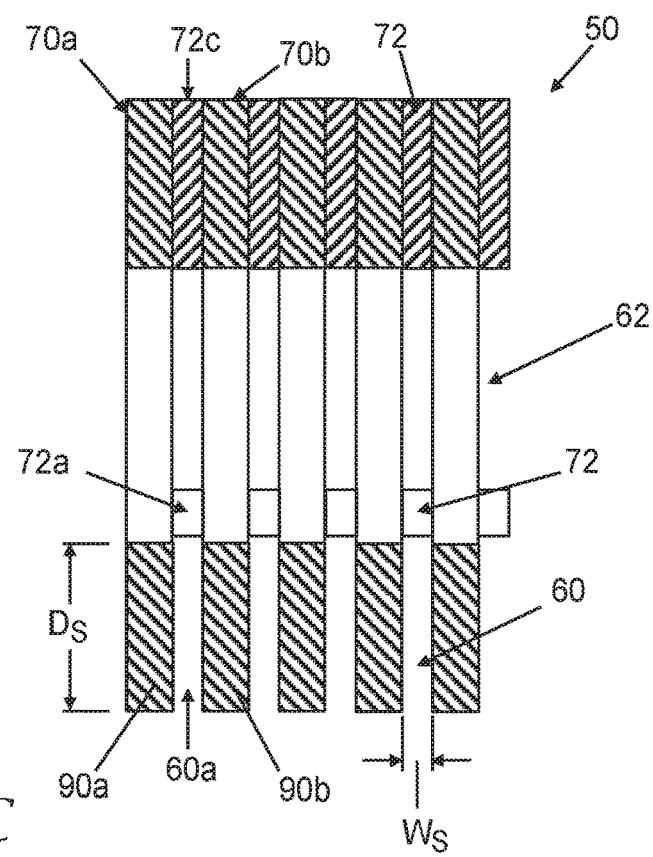
FIG. 2C is an enlarged cross-sectional view of a portion of the tool of FIG. 2A taken along the line 2C-2C.

The distribution device 22 is configured to effectuate gross biased orientation and alignment of at least a majority of the abrasive particles 36 as applied and subsequently bonded to the major face 38. With this in mind, portions of one embodiment of a distribution tool 50 in accordance with principles of the present disclosure and useful with or as the distribution device 22 (FIG. 1) are shown in simplified form in FIG. 2A-2C. In general terms, the distribution tool 50 has a generally cylindrical shape, for example akin to a hollow right cylinder, and defines a plurality of slots 60. The slots 60 are each open to an exterior of the distribution tool 50. For reasons made clear below, the distribution tool 50 can have or define a central bore 62 in some embodiments; where provided, each of the slots 60 are also open to the central bore 62. Regardless, the distribution tool 50 is configured to distribute abrasive particles (not shown) from a lower side 64 (referenced generally in FIG. 2A) thereof in a manner that grossly orients and aligns the abrasive particles. For example, and as described in greater detail below, the slots 60 extend in a circumferential direction of the cylindrical shape and each have a substantially similar width $W_S$ (e.g., the width $W_S$ of the slots 60 varies from one another by no more than 10%) that is selected in accordance with expected nominal dimensions of the abrasive particles so as to grossly bias the abrasive particles to a spatial orientation at the lower side 64.

Figure 3A:
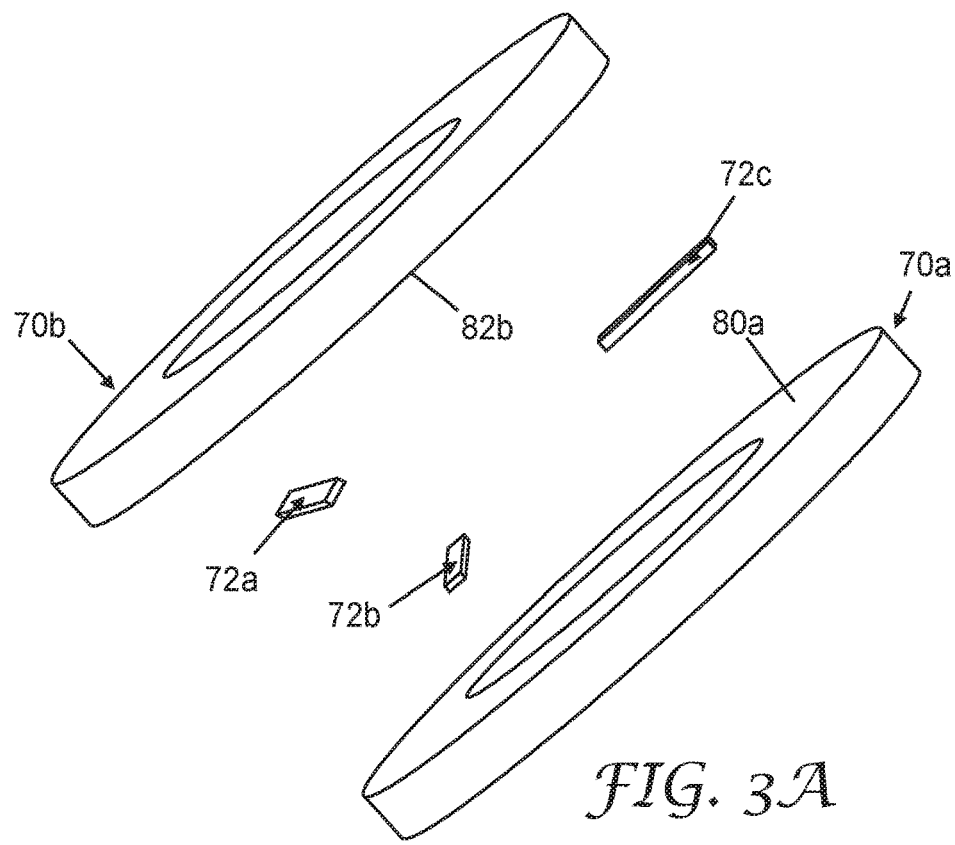
FIG. 3A is an exploded, perspective view of rings and spacer bodies useful with the tool of FIG. 2A.
Figure 3B:
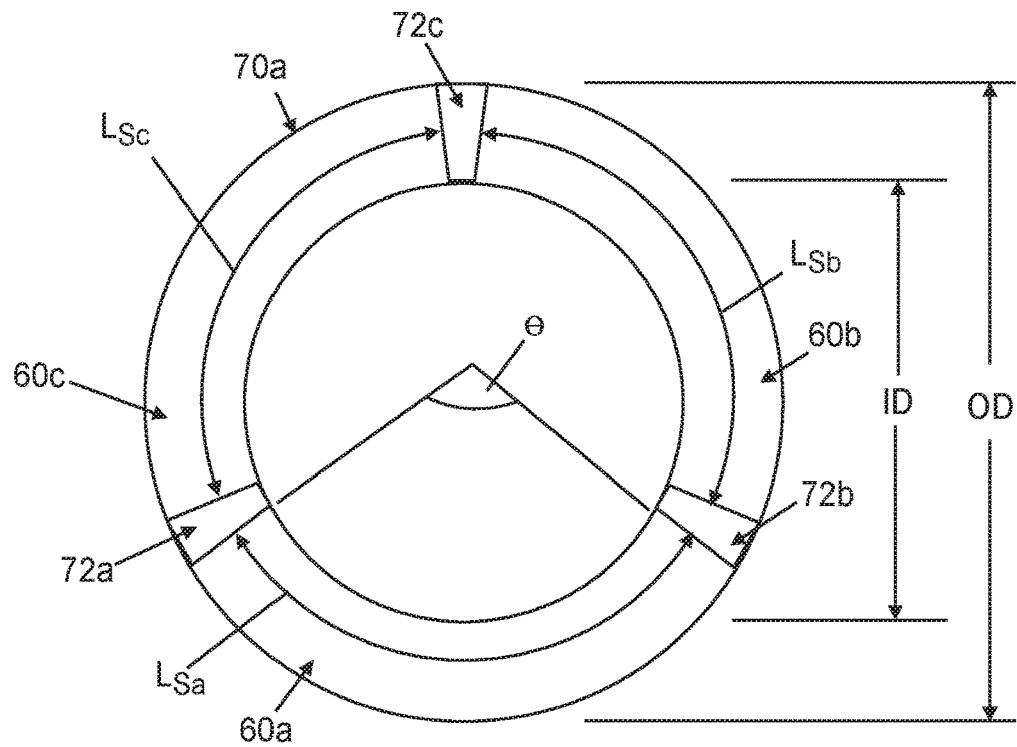
FIG. 3B is a top plan view of one of the rings and the spacer bodies of FIG. 3A.

The distribution tool 50 can be constructed in various manners, and in some embodiments includes a plurality of aligned rings 70. Size, shape and dimensions of the rings 70 can be substantially identical (e.g., the size, shape and dimensions of each of the rings 70 varies from one another by no more than 10%), and the rings 70 can be constructed of a rigid, robust material such as metal, plastic, etc. Immediately adjacent ones of the rings 70 are maintained relative to one another in a spaced apart fashion by one or more spacer bodies 72 so as to generate one or more of the slots 60. For example, FIG. 3A illustrates in exploded form two of the rings 70a, 70b and three of the spacer bodies 72 (identified as 72a-72c). The spacer bodies 72 can be provided apart from the rings 70; in other embodiments, the spacer bodies 72 are integrally formed with a corresponding one of the rings 70. Upon final assembly, the spacer bodies 72 are attached to or otherwise extend between a leading face 80a of the first ring 70a, and a trailing face 82b (referenced generally) of the second ring 70b. In this regard, FIG. 3B illustrates the spacer bodies 72a-72c as assembled to (or integrally formed with) the leading face 80a of the first ring 70a (it being understood that the second ring 70b will be assembled on to the spacer bodies 72, mirroring the shape and arrangement of the first ring 70a). The spacer bodies 72a-72c can be equidistantly spaced from one another (relative to a circumference of the ring 70a), and can have substantially identical dimensions (e.g., within 10% of truly identical dimensions) optionally selected so as to extend entirely to and between inner and outer diameters ID, OD of the ring 70a. While three of the spacer bodies 72 are shown, in other embodiments, immediately adjacent ones of the rings 70 (FIG. 2A) can be connected by a greater or lesser number of spacer bodies 72. Further, the spacer bodies 72 need not be equidistantly spaced.

Regardless of number and arrangement, the spacer bodies 72 as provided between two of the rings 70 serve to define opposing ends of the corresponding slot(s) 60 associated with the rings 70. For example, FIG. 3B generally identifies the location of first, second and third slots 60a-60c that will be defined upon assembly of the second ring 70b (FIG. 3A) over the first ring 70a (i.e., the second ring 70b is mounted to the spacer bodies 72a-72c). By way of further clarification, the first and second rings 70a, 70b are also identified in the cross-sectional view of FIG. 2C; the first slot 60a is defined between opposing walls 90a, 90b that are otherwise formed or provided by the first and second rings 70a, 70b, respectively. The first slot 60a has a depth $D_S$ defined by a width of the rings 70a, 70b. Returning to FIG. 3B, the first slot 60a is bounded at opposite ends by the first and second spacer bodies 72a, 72b. With this construction, a length $L_{Sa}$ of the first slot 60a is defined as an arc extending in the circumferential direction of a shape of the first ring 70a (and thus in the circumferential direction of the cylindrical shape of the distribution tool 50 (FIG. 2A)). Due to this arc shape, a central angle $\Theta$ of the length $L_{Sa}$ of the first slot 60a is defined. The second and third slots 60b, 60c are similarly generated relative to the first ring 70a (i.e., the second slot 60b has a length $L_{Sb}$ between the second and third spacer bodies 72b, 72c; the third slot 60c has a length $L_{Sc}$ between the first and third spacer bodies 72a, 72c). With embodiments in which the spacer bodies 72a-72c are equidistantly spaced about the ring 70a, the central angle $\Theta$ associated with each of the slot lengths $L_{Sa}$, $L_{Sb}$, $L_{Sc}$ will be substantially identical (e.g., within 10% of a truly equidistant spacing), on the order of 120 degrees. In other embodiments, the spacer bodies 72a-72c are not equidistantly spaced from one another such the central angles $\Theta$ can differ. In yet other embodiments, more than three of the spacer bodies 72 can be provided between two adjacent rings 70 (e.g., between the first and second rings 70a, 70b), such that the central angle $\Theta$ of at least one of the corresponding slot lengths $L_S$ can be substantially less than 120 degrees. Conversely, other embodiments provide only one or two of the spacer bodies 72 between two adjacent rings 70, such that the central angle $\Theta$ of at least one of the corresponding slot lengths $L_S$ is substantially greater than 120 degrees. Moreover, and with additional reference to FIG. 2A, the number and arrangement of the spacer bodies 72 between adjacent pairs of the rings 70 can vary and need not be identical, such that the various slot lengths $L_S$ and corresponding central angles $\Theta$ provided throughout the distribution tool 50 can be substantially identical or substantially different. In some embodiments, at least some of the slot length central angles $\Theta$, alternatively a majority of the slot length central angles $\Theta$, alternatively all of the slot length central angles $\Theta$, provided throughout the distribution tool 50 are not less than 30 degrees, alternatively not less than 60 degrees, alternatively not less than 90 degrees.

The slot length $L_S$ is selected in accordance with expected nominal dimensions of the abrasive particles (not shown) with which the distribution tool 50 will be used as described in greater detail below, including the channel length $L_C$ being sufficient to simultaneously receive a multiplicity of the abrasive particles.

The distribution tool 50 is configured such that upon final assembly and use as part of the abrasive article manufacturing system 20 (FIG. 1), abrasive particles (not shown) will become loaded into certain ones of the slots 60. The number of slots 60 provided with the distribution tool 50 is selected as a function of the desired slot width $W_S$ and a dimension (e.g., cross-web width) of the backing construction web 24 (FIG. 1) as described in greater detail below. In yet other embodiments, the distribution device 22 (FIG. 1) can include two or more of the distribution tools 50 assembled in series to a carrier frame or similar structure.

Figure 4A:
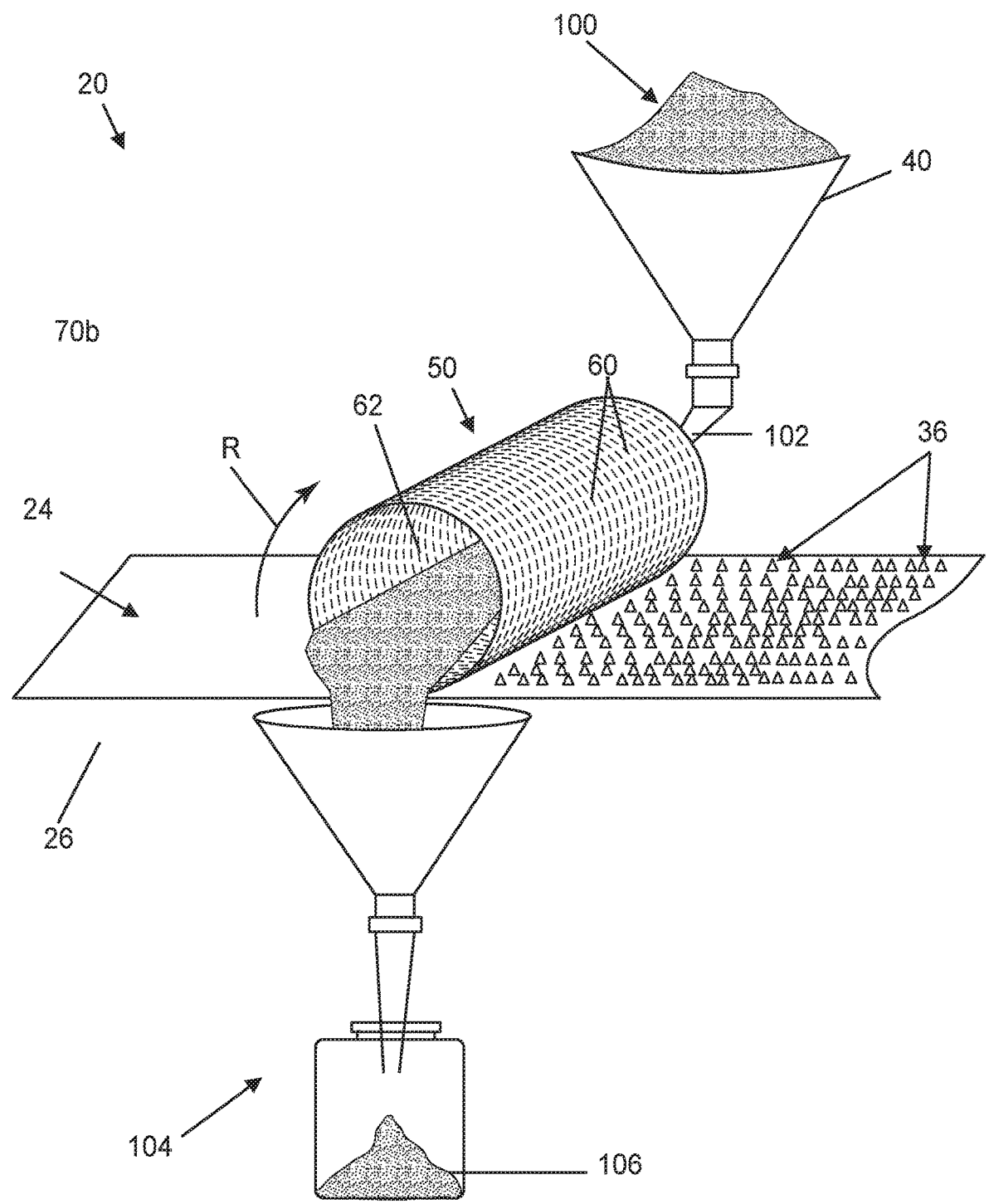
FIG. 4A is a perspective view of the distribution tool of FIG. 2A as part of a system for manufacturing abrasive articles and distributing abrasive particles on to a web.

Incorporation of the distribution tool 50 as part of the abrasive article manufacturing system 20 is generally reflected by FIG. 4A. The distribution tool 50 is located immediately adjacent (e.g., slight above by a distance described in greater detail below) the backing construction web 24. Further, the distribution tool 50 is configured and arranged relative to the backing construction web 24 such that the slots 60 (referenced generally) optionally are substantially aligned (e.g., within 10% of a truly aligned relationship) with the machine direction 26 (e.g., the slot length $L_S$ (FIG. 3B) of each of the slots 60 is substantially aligned or parallel with (e.g., within 10% of a truly aligned or parallel relationship) the machine direction 26; other arrangements are also envisioned, such as the slots 60 being arranged substantially perpendicular to the machine or travel direction 26.

Figure 4B:
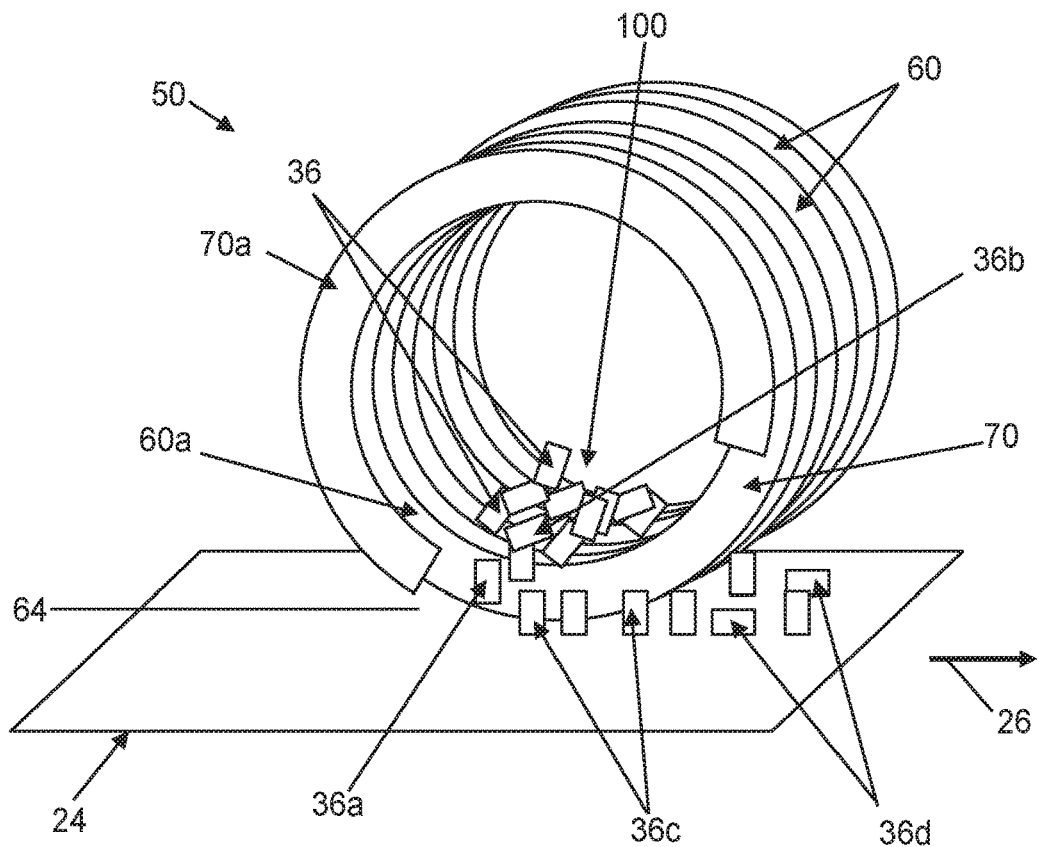
FIG. 4B is a simplified view of a segment of the arrangement of FIG. 4A with portions removed.

During use, a supply 100 (referenced generally) of the abrasive particles 36 is loaded to the distribution tool 50 via the source 40. For example, the source 40 can be akin to a mineral dropper having an outlet 102 (referenced generally) that extends into the central bore 62. The supply 100 of the abrasive particles 36 flows through the outlet 102 and into the central bore 62. Once within the central bore 62, individual ones of the abrasive particles 36 will enter a respective one of the slots 60 only upon achieving a gross spatial orientation dictated by dimensions of the slots 60. For example, FIG. 4B is a simplified representation of a portion of the distribution tool 50 with a portion of the first ring 70a removed such that abrasive particles 36 in the first slot 60a are visible. A first abrasive particle 36a in FIG. 4B is spatially oriented so as to enter the first slot 60a, whereas a spatial orientation of a second abrasive particle 36b prevents entry into any of the slots 60. As a point of reference, loading of the supply 100 can include pouring or funneling (e.g., via vibratory feeder, belt driven drop coater, etc.) a large number of the abrasive particles 36 on to (or into) the distribution tool 50 under the force of gravity, with individual ones of the so-loaded abrasive particles 36 randomly assuming any spatial orientation. With reference between FIGS. 4A and 4B, as the individual abrasive particles 36 repeatedly contact one or more of the rings 70, they deflect and assume a new spatial orientation, eventually becoming generally aligned with and assuming a spatial orientation appropriate for entering one of the slots 60. In this regard, as the supply 100 of the abrasive particles 36 flows into the distribution tool 50, the distribution tool 50 is rotated (e.g., via a rotation device (not shown) connected to the distribution tool 50); with this rotation (indicated by the arrow R in FIG. 4A), the abrasive particles 36 mix and/or vibrate around on surfaces of the distribution tool 50 until they obtain a suitable orientation and fall through one of the slots 60. Regardless, a large number of abrasive particles 36 can be disposed within individual one of the slots 60 at any one point in time.

Once a necessary spatial orientation is achieved, the so-arranged abrasive particle 36 passes through the corresponding slot 60, falls on to the backing construction web 24 and is at least partially bonded thereto (e.g., the third abrasive particles 36c identified in FIG. 4B). As described in greater detail below, the lower side 64 of the distribution tool 50 is spaced from the backing construction web 24 by a gap G (FIG. 9A) that is less than a maximum dimension(s) of the abrasive particles 36. Thus, a portion of the applied abrasive particles 36c remains within the corresponding slot 60 when initially applied to the backing construction web 36. The backing construction web 24 is driven relative to the distribution tool 50 in the machine direction 26, such that the applied abrasive particles 36c travel relative to the distribution tool 50 with movement of the backing construction web 24, freely sliding within the corresponding slot 60. During this movement, one or more of the rings 70 of the distribution tool 50 support the applied abrasive particles 36c, preventing the applied abrasive particles 36c from experiencing an overt change in spatial orientation (e.g., the applied abrasive particles 36c are preventing from overtly tipping or rotating in a direction perpendicular to the corresponding slot 60). Upon traveling beyond the distribution tool 50, the abrasive particles 36 are now more firmly bonded to the backing construction web 24 (e.g., abrasive particles 36d identified in FIG. 4B), and maintain the gross biased orientation and alignment dictated by the distribution tool 50. In other words, systems and methods of the present disclosure include the applied abrasive particles 36c being in simultaneous contact with the backing construction web 24 and one (or more) of the rings 70 of the distribution tool 50 over a dwell period in which the applied abrasive particle 36c is caused to travel beyond the distribution tool 50.

In some embodiments, some of the abrasive particles 36 included with the supply 100 dispensed or loaded into the distribution tool 50 will not become correctly oriented or are otherwise prevented from entering one of the slots 60. As the supply 100 continuously flows into the distribution tool 50, then, a percentage of the so-loaded abrasive particles 36 will flow or pass through the distribution tool 50. As shown in FIG. 4A, a collection unit 104 is optionally provided for collecting an excess 106 of the abrasive particles 36.

Figure 5:
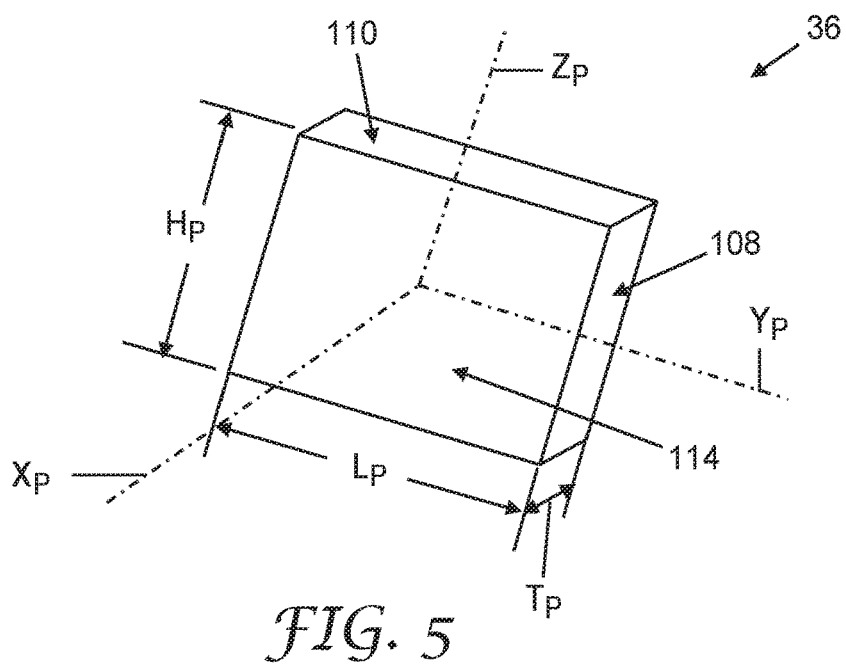
FIG. 5 is a perspective view of an abrasive particle useful with the tools, systems, and methods of the present disclosure.

The gross biased orientation and alignment provided by distribution tools of the present disclosure can be characterized by reference to major axes and dimensions of the abrasive particle. FIG. 5 is a generic, non-limiting example of the abrasive particle 36, the exterior shape of which defines a particle maximum length, maximum height and maximum thickness $L_P$, $H_P$, $T_P$ dimensions that represent maximum dimensions of the abrasive particles 36 in three orthogonal planes. The particle maximum length, height and thickness $L_P$, $H_P$, $T_P$ are a function of a shape of the abrasive particle 36, and the shape may or may not be uniform. The present disclosure is in no way limited to any particular abrasive particle shape, dimensions, type, etc., and several exemplary abrasive particles useful with the present disclosure are described in greater detail below. However, with some shapes, the "height" of the abrasive particle 36 may more conventionally be referred to as a "width". The abrasive particle 36 is shown in FIG. 5 as arbitrarily having a rectangular prism shape, with opposing major faces 110 (one of which is visible), opposing major side faces 112 (one of which is visible), and opposing minor side faces 114 (one of which is visible). Regardless of an exact shape, any abrasive particle can be described as providing the particle maximum length $L_P$ as the largest dimension in any one plane, the particle maximum height $H_P$ as being the largest dimension in any plane orthogonal to the plane of the maximum length $L_P$, and the maximum thickness $T_P$ as being the largest dimension in a third plane orthogonal to the planes of the maximum length $L_P$ and height $H_P$. The particle maximum length $L_P$ is greater than or equal to the particle maximum height $H_P$, and the particle maximum height $H_P$ is greater than or equal to the particle maximum thickness $T_P$. Abrasive particles useful with the present disclosure can have circular geometries such that the terms "length," "height" or "thickness" are inclusive of diameter.

A shape of the abrasive particle 36 defines a centroid at which particle $X_P$, $Y_P$ and $Z_P$ axes can be defined (the particle $X_P$, $Y_P$ and $Z_P$ axes are orthogonal relative to one another). With the conventions of FIG. 5, the particle $Z_P$ axis is parallel with the maximum height $H_P$, the $Y_P$ axis is parallel with the maximum length $L_P$, and the $X_P$ axis is parallel with the maximum thickness $T_P$. As a point of reference, the particle $X_P$, $Y_P$, $Z_P$ axes are identified for the abrasive particle 36 as a standalone object independent of the backing construction web 24 (FIG. 4A); once applied to the backing construction web 24, a "z-axis rotation orientation" of the abrasive particle 36 is defined by the particle's angular rotation about a z-axis passing through the particle and through the backing to which the particle is attached at a 90 degree angle to the backing.

Figure 6A:
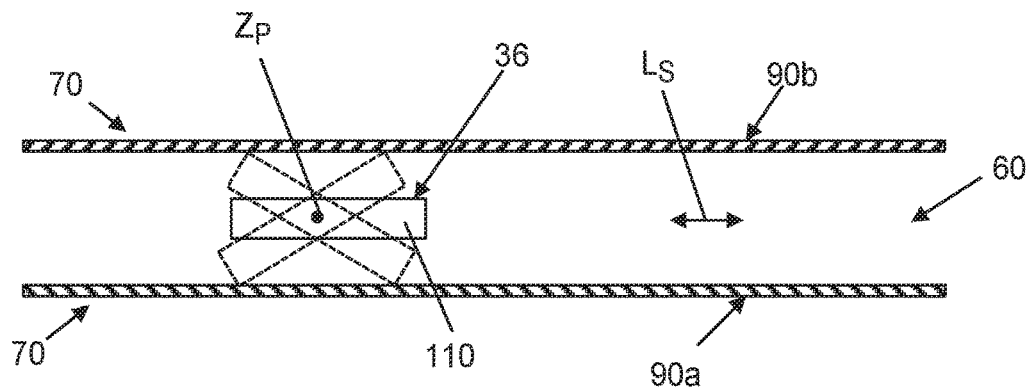
FIG. 6A is a top view of a portion of the distribution tool of FIG. 2A interacting with the abrasive particle of FIG. 5.
Figure 6B:
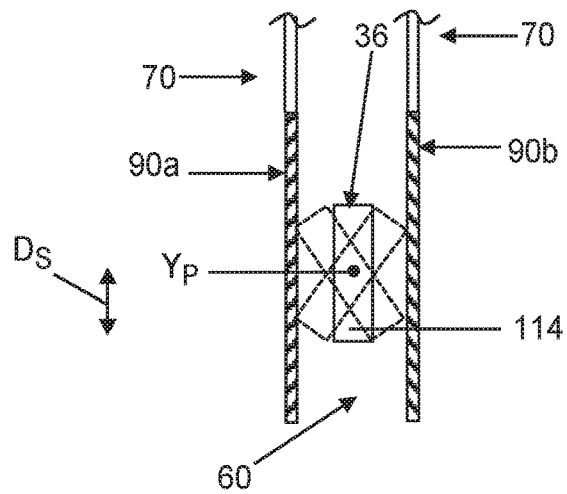
FIG. 6B is an end view of the arrangement of FIG. 6A.
Figure 6C:
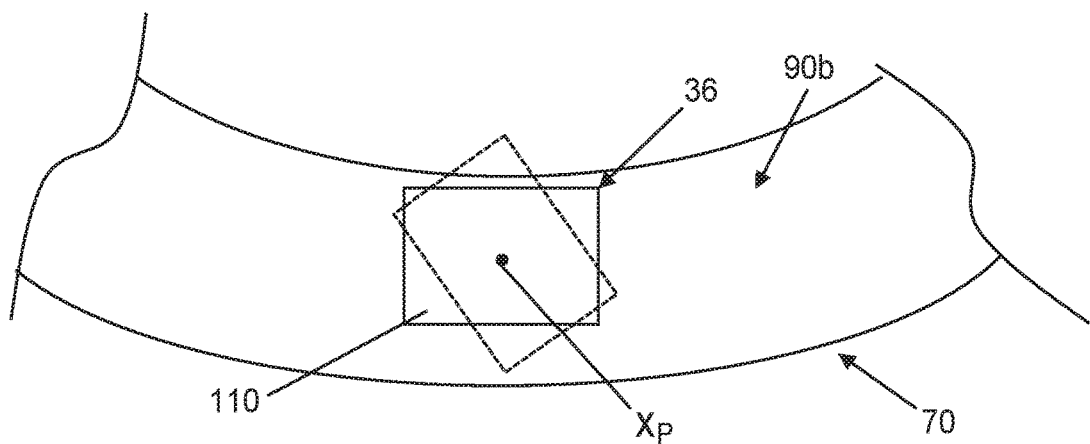
FIG. 6C is a side view of the arrangement of FIG. 6A.

The gross biased orientation effected by the distribution tools of the present disclosure entail dictating or limiting a spatial arrangement of the abrasive particle to a range of rotational orientations about the particle $Z_P$ axis and to a range of rotational orientations about the particle $Y_P$ axis; the gross biased orientation does not dictate or limit a rotational orientation about the particle $X_P$ axis. For example, FIG. 6A provides a simplified top view of the abrasive particle 36 within one of the slots 60. The opposing walls 90a, 90b (as provided by the opposing rings 70) limit a rotational orientation of the abrasive particle 36 about the $Z_P$ axis to a range reflected by phantom representations of the abrasive particle 36. Similarly, FIG. 6B is a simplified end view of the abrasive particle 36 within the slot 60. Gross biased orientation includes the opposing walls 90a, 90b limiting a rotational orientation of the abrasive particle 36 about the $Y_P$ axis within a range reflected by phantom representations of the abrasive particle 36. Finally, FIG. 6C is a simplified side view of the abrasive particle 36 within the slot 60 (referenced generally) relative to one of the walls 90b (it being understood that the opposing wall 90a of the slot 60 is not visible). The abrasive particle 36 can freely assume any rotational orientation about the $X_P$ axis (one possible rotational orientation about the $X_P$ axis is represented in phantom in FIG. 6C).

Figure 7A:
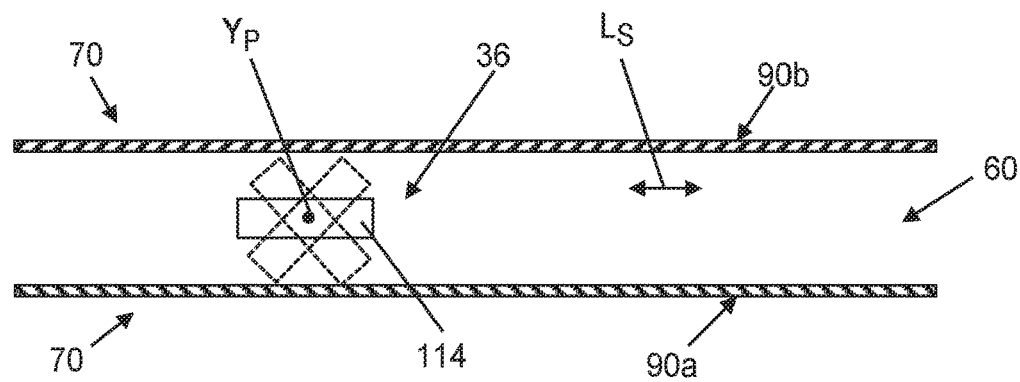
FIGS. 7A-7C illustrate the arrangement of FIGS. 6A-6C with the abrasive particle in a different orientation.
Figure 7B:
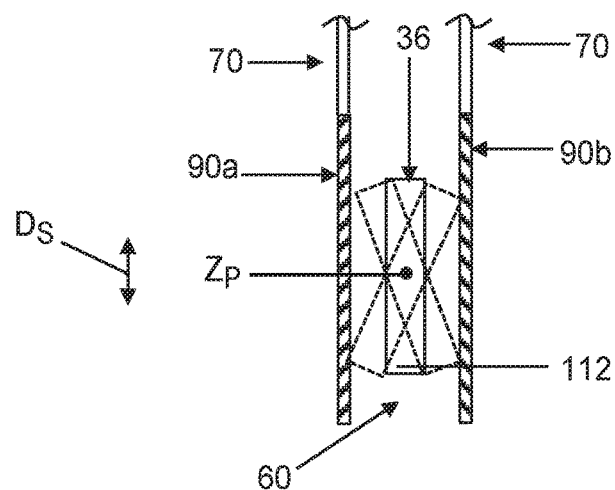
Figure 7C:
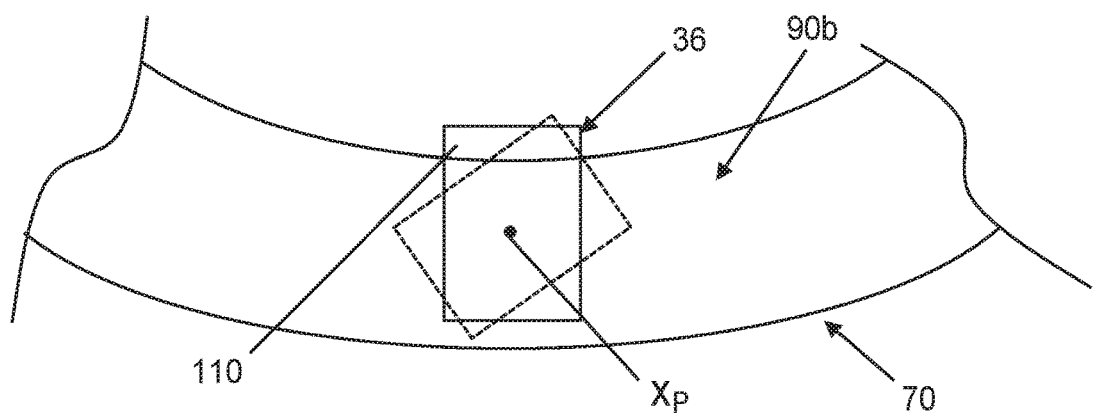

Depending upon the dimensions of the slot 60 and of the abrasive particle 36, the abrasive particle 36 may be able to "fit" within the slot 60 such that the particle $Y_P$ and $Z_P$ axes are rotated 90 degrees from the representations of FIGS. 6A and 6B in which the abrasive particle 36 is randomly arranged with the major side faces 112 parallel with the slot length $L_S$. FIGS. 7A-7C is another possible arrangement in which the minor side faces 114 are parallel with the slot length $L_S$. Once again, a gross biased orientation is achieved in which the abrasive particle 36 is limited to a range of orientations about the particle's $Y_P$ and $Z_P$ axes; the abrasive particle 36 can assume any rotational orientation about the particle $X_P$ axis.

With the above general explanations in mind and with reference between FIGS. 2A-2C and 5, it will be recalled that dimensions of the slots 60 are selected as a function of expected geometry or dimensions of the abrasive particles 36 to be processed. In more general terms, the arrangement and dimensions of the slots 60 are selected based upon the particle maximum length $L_P$, maximum height $H_P$, and maximum thickness $T_P$ of the abrasive particles to be processed (it being understood that a bulk supply of a particular abrasive particle will purport to contain identically sized and shaped abrasive particles; invariably, however, individual ones of the abrasive particles within the bulk supply will have dimensions that slightly vary from one another within an accepted tolerances; thus, when selecting arrangement and dimensions for the slots 60 for distributing the abrasive particles of the bulk supply as described in the present disclosure, the "dimensions" of any one abrasive particle of the bulk supply can be with reference to nominal dimension of the bulk supply).

Dimensions of the slots 60 are generally configured such that the slot width $W_S$ is less than at least the abrasive particle maximum length $L_P$, and optionally less than the abrasive particle maximum height $H_P$, dictating that the abrasive particle 36 must achieve a gross biased orientation before entering and passing through one of the slots 60, with the opposing walls 90a, 90b further serving to support the abrasive particle 36 in the biased orientation as described below. While the slot width $W_S$ can closely approximate the maximum thickness $T_P$ so as to dictate a more precise particle $Z_P$ axis and $Y_P$ axis rotational orientation of the applied abrasive particles 36 (i.e., as the slot width $W_S$ approaches the maximum thickness $T_P$, the range of possible $Z_P$ axis and $Y_P$ axis rotational orientations the abrasive particle 36 can assume and still "fit" in the slot 60 is reduced), in some embodiments, the slot width $W_S$ is greater than the maximum thickness $T_P$ for enhanced throughput time (i.e., by providing a larger slot width $W_S$, abrasive particles 36 can randomly assume a larger range of $Z_P$ axis and $Y_P$ axis rotational orientations and still enter/pass through one of the slots 60, thereby making it "easier" for an individual abrasive particle 36 to obtain an appropriate spatial orientation thus improving the mass flow rate of the abrasive particles 36 through the distribution tool 50), approaching, but not exceeding, the particle maximum length and maximum height $L_P$, $H_P$. For example, the slot width $W_S$ can be at least 125%, alternatively at least 150%, of the particle maximum thickness $T_P$. Alternatively or in addition, the slot width $W_S$ can be 50-75% of the maximum height $H_P$ (so long as the calculated value is greater than the maximum thickness $T_P$). In yet other embodiments, the selected slot width $W_S$ is a non-integer factor of the maximum thickness $T_P$ (i.e., the slot width $W_S$ is not equal to the maximum thickness $T_P$, $2T_P$, $3T_P$, etc.) to avoid clogging (e.g., were the slot width $W_S$ to be equal to two times the maximum thickness $T_P$, two abrasive particles 36 could become aligned side-by-side each other and then collectively become lodged to the opposing walls 90a, 90b of one of the slots 60).

Figure 8:
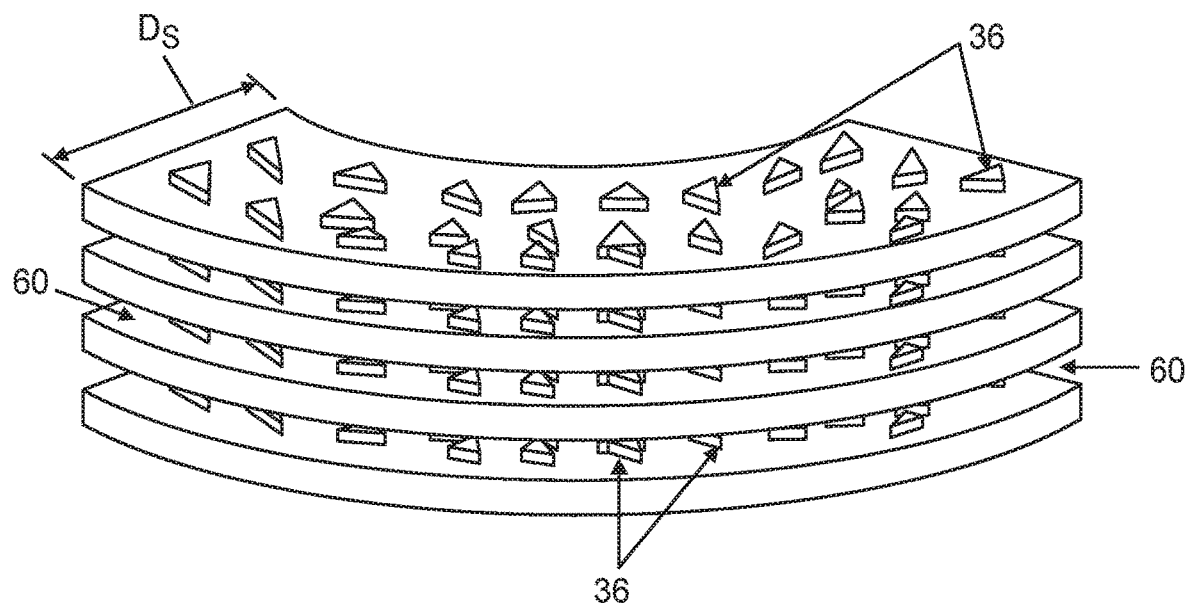
FIG. 8 is an enlarged perspective view of a portion of the distribution tool of FIG. 2A interacting with the abrasive particles of FIG. 5.

The slot depth $D_S$ is selected to approximate or be greater than at least the particle maximum height $H_P$ (or particle maximum length $L_P$ where the shape of the particular abrasive particle does not implicate a height differing from a length) so as to better ensure that individual ones of the abrasive particles 36 attain the desired gross biased orientation and are supported in this orientation as they traverse the corresponding slot 60. Thus, the slot depth $D_S$ is at least equal to the maximum particle height $H_P$ in some embodiments. As reflected in FIG. 8, then, with some constructions, a multiplicity of the abrasive particles 36 can simultaneously be within a respective one of the slots 60.

Figure 9A:
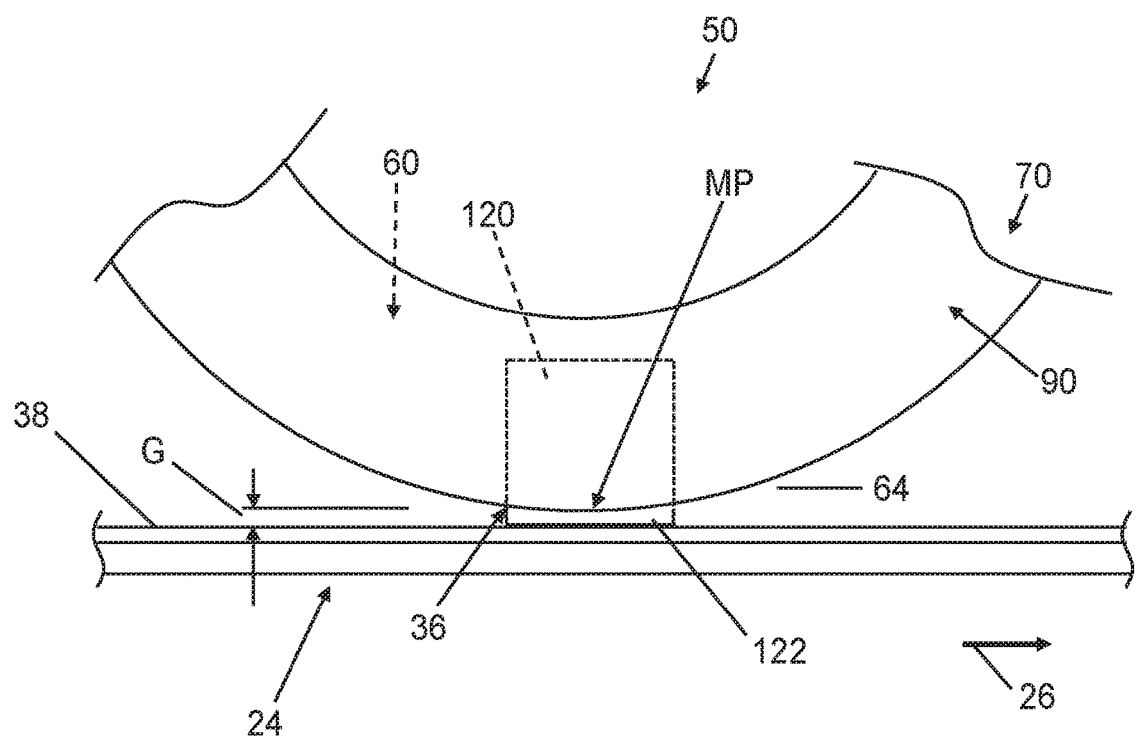
FIG. 9A is an enlarged side view of a portion of the distribution tool of FIG. 2A interacting with the abrasive particle of FIG. 5 as part of a system for manufacturing abrasive articles.

Dimensions of the abrasive particles 36 can also be utilized to determine a size of the gap G between the lower side 64 of the distribution tool 50 and the backing construction web 24 as shown in FIG. 9A. In particular, the gap G is sized so as to ensure that once in contact with the backing construction web 24, a portion of the abrasive particle 36 remains "within" the corresponding slot 60 (referenced generally in FIG. 9A, it being understood that in the view of FIG. 9A, the slot 60 is "hidden" behind the ring 70 otherwise visible in the illustration), supported by at least one of the corresponding walls 90. Due to the circular shape of the walls 90 and the linear shape of the backing construction web 24, a size of the gap G increase in opposite directions from a mid-point MP. In some embodiments and with cross-reference between FIGS. 5 and 9A, the size of the gap G at the mid-point MP is 10-90% of the particle maximum height $H_P$, alternatively 25-75% of the particle maximum height $H_P$. For example, in the illustration of FIG. 9A, the abrasive particle 36 has achieved the gross biased orientation dictated by the distribution tool 50, fallen along one of the slots 60, and become arranged on the backing construction web 24 near the mid-point MP. Because a size of the gap G at the mid-point MP is less that the particle maximum height $H_P$, a first portion 120 of the abrasive particle 36 remains within the slot 60, and a second portion 122 is beyond the lower side 64. Thus, the abrasive particle 36 is supported by at least one of the walls 90 (i.e., the first portion 110 contacts at least one of the walls 90) as the abrasive particle 36 traverses along the distribution tool 50 with movement of the backing construction web 24 in the machine direction 26. In other embodiments, the mid-point MP can be located in even closer proximity to the backing construction web 24, including being in contact with the major face 38.

Figure 9B:
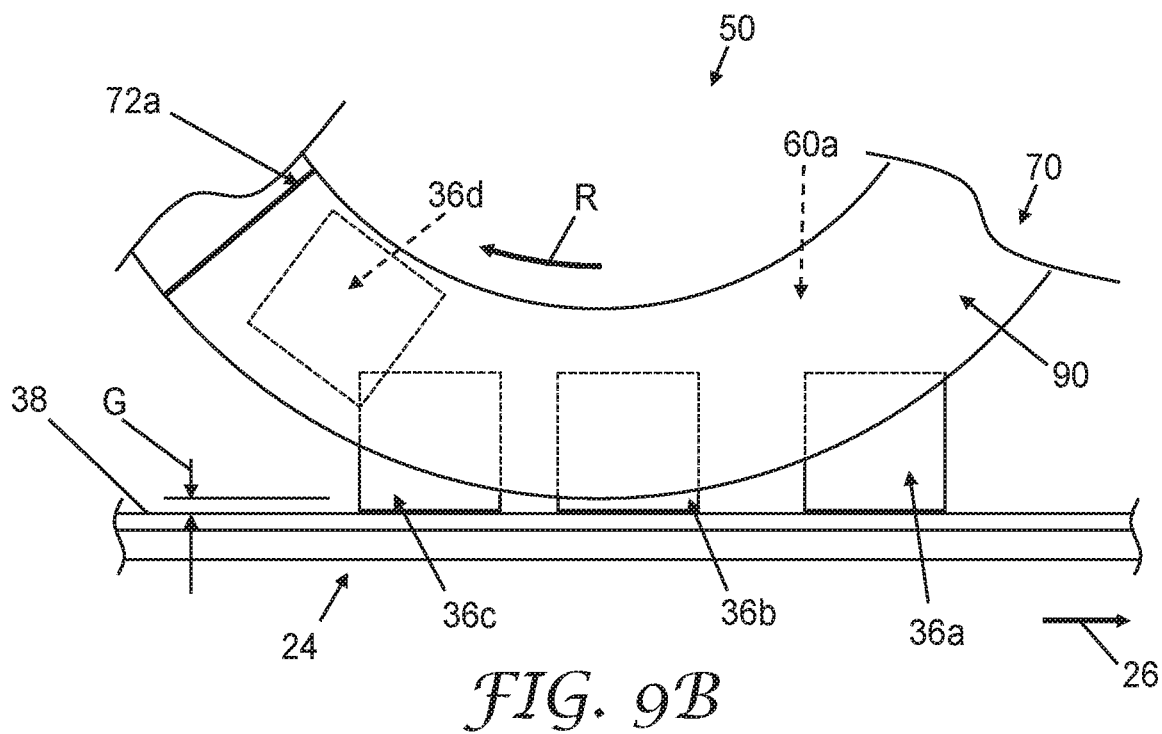
FIGS. 9B and 9C are enlarged side views illustrating interaction of the distribution tool with a plurality of the abrasive particles of FIG. 5 at different points in time.

The slot length $L_S$ (FIG. 3A) and the gap G can also be selected as a function of the dimensions of the abrasive particles 36, and in particular to facilitate or allow a multiplicity of the abrasive particles 36 to simultaneously contact the major face 38 and at least partially project into the same slot 60. For example, FIG. 9B reflects operation of the distribution tool 50 at a first point in time. First-third abrasive particles 36a-36c have previously achieved an appropriate spatial orientation, fallen along the first slot 60a (referenced generally) and become arranged on the backing construction web 24. Relative to the machine direction 26 of the backing construction web, the first abrasive particle is downstream of the second and third abrasive particles 36b, 36c. The slot length $L_S$ (FIG. 3B) is sufficiently large and the gap G sufficiently small such that at the point in time of FIG. 9B, the first-third abrasive particles 36a-36c are simultaneously at least partially within the first slot 60a and in contact with the major face 38. As a point of reference, a first end of the first slot 60a is defined by the first spacer body 72a (schematically drawn in FIG. 9B); the opposing second end of the first slot 60a is not yet visible at the point in time of FIG. 9B. As described above, the first-third abrasive particles 36a-36c can be supported in the upright position shown via contact with one of the walls 90 of the first slot 60a. FIG. 9B further depicts a fourth abrasive particle 36d that has achieved an appropriate spatial orientation and begun falling along the first slot 60a. The fourth abrasive particle 36d has not yet come into contact with the major face 38 of the backing construction web 24. As a point of reference, it will be recalled that in some embodiments, the distribution tool 50 is rotated during use. FIG. 9B identifies the direction of rotation R for the distribution tool 50; the direction of rotation R can be generally opposite the machine direction 26 to promote abrasive particles 36 entering the slots (e.g., the first slot 60a) "upstream" (relative to the machine direction 26) of previously applied abrasive particles 36 (e.g., the first-third abrasive particles 36a-36c) so as to minimize occurrence of "new" abrasive particles falling on top of previously-applied abrasive particles.

Figure 9C:
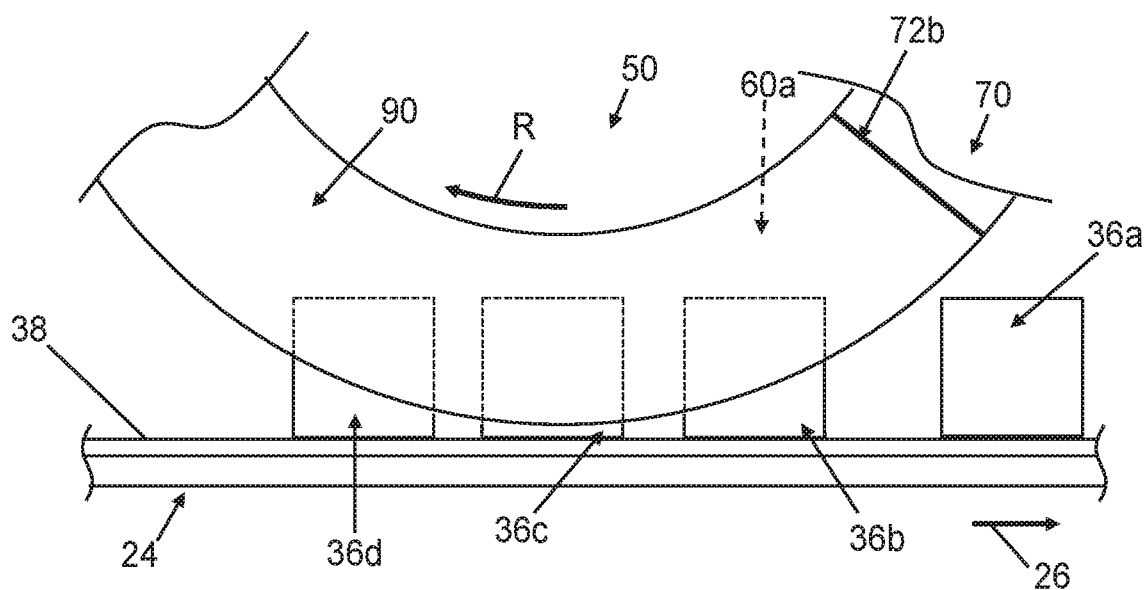

FIG. 9C depicts the arrangement of FIG. 9B at a second, later point in time. As shown, the backing web construction 24 has continued to move in the machine direction 26, advancing the first-third abrasive particles 36a-36c relative to the distribution tool 50 (e.g., the first abrasive particle 36a has now progressed beyond the distribution tool 50). The distribution tool 50 has also continued to rotate in the direction of rotation R, with the opposing second end (defined by the second spacer body 72b) of the first slot 60b now visible in the view. The fourth abrasive particle 36d has fallen along the first slot 60a and is now in contact with the major face 38. Once again, the slot length $L_S$ (FIG. 3B) is sufficiently large and the gap G sufficiently small such that at the point in time of FIG. 9C, the second-fourth abrasive particles 36b-36d are simultaneously at least partially within the first slot 60a and in contact with the major face 38.

Figure 10A:
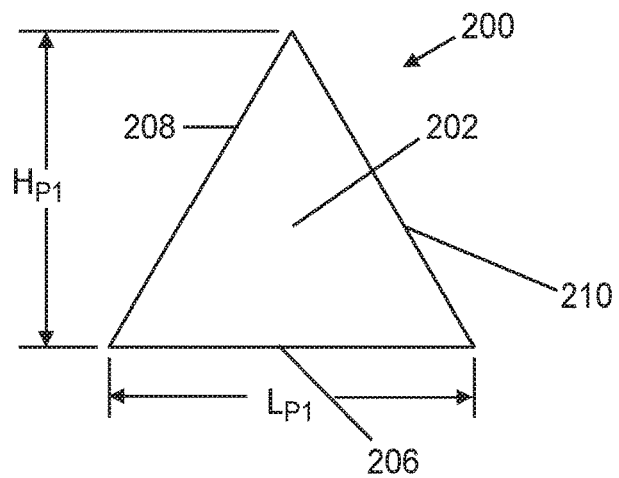
FIG. 10A is a top plan view of another abrasive particle useful with the tools, systems, and methods of the present disclosure.
Figure 10B:
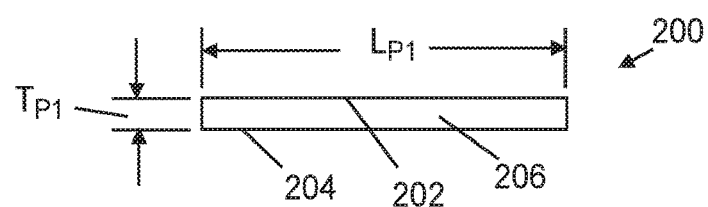
FIG. 10B is an end view of the abrasive particle of FIG. 10A.
Figure 10C:
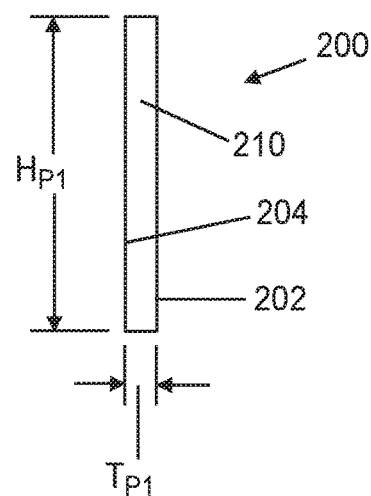
FIG. 10C is a side view of the abrasive particle of FIG. 10A.

The above criteria for construction of the distribution tools of the present disclosure, and in particular arrangement and dimensions of the slots 60 and the gap G, can be applied to a plethora of different abrasive particle constructions. For example, particle maximum length, height and thickness $L_{P1}$, $H_{P1}$, $T_{P1}$ are designated for one exemplary abrasive particle 200 shape in FIGS. 10A-10C. A shape of the abrasive particle 200 is akin to an equilateral triangular prism, with FIG. 10A providing a top view, FIG. 10B an end view, and FIG. 10C a side view. Due to the equilateral triangular prism shape, the maximum length $L_{P1}$ and the maximum height $H_{P1}$ are uniform across a thickness of the abrasive particle 200 (i.e., the abrasive particle 200 can be viewed as defining opposing major faces 202, 204; the maximum length and height $L_{P1}$, $H_{P1}$ exist at both of the faces 202, 204). The maximum height $H_{P1}$ is known or can be calculated, and is less than the maximum length $L_{P1}$. The maximum thickness $T_{P1}$ is less than the maximum length and height $L_{P1}$, $H_{P1}$. Side faces 206-210 of the abrasive particle 200 have an identical shape and size, and are perpendicular to the major faces 202, 204.

Figure 11A:
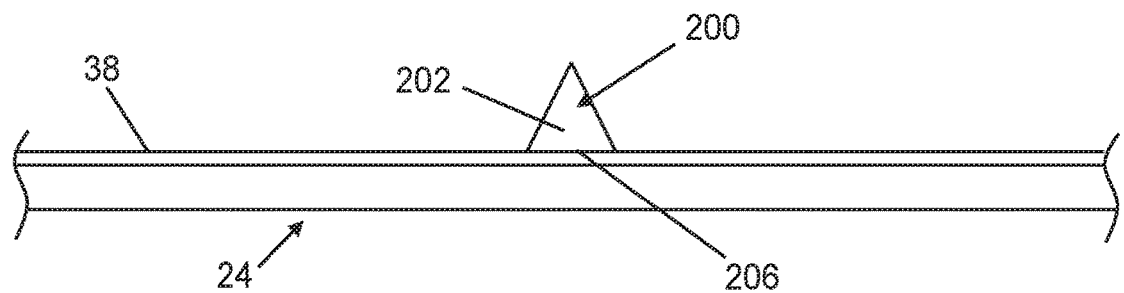
FIG. 11A is a side view of the abrasive particle of FIG. 10A attached to a backing.

An abrasive article manufacturer may prefer that the abrasive particle 200 be applied to and retained at the major face 38 of the backing construction web 24 in an "upright" position as generally reflected by FIG. 11A (i.e., one of the side faces 206-210 of the abrasive particle 200 bears against or is embedded into the backing construction web major face 38, as compared to a non-upright orientation in which one of the particle major faces 202, 204 is at the backing construction web major face 38). With reference to FIGS. 2A-2C and 10A-10C, the distribution tool 50 can be configured to grossly bias the abrasive particle 200 to the desired upright position by forming the slot width $W_S$ to be less than the particle maximum length and height $L_{P1}$, $H_{P1}$, and greater than the maximum thickness $T_{P1}$, commensurate with the descriptions above.

The slot depth $D_S$ is selected to approximate or be greater than the maximum height $H_{P1}$ so as to better ensure that individual ones of the abrasive particles 200 attain the desired gross biased orientation and are supported in this orientation as they traverse the corresponding slot 60. Thus, the slot depth $D_S$ is at least equal to the particle maximum height $H_{P1}$ in some embodiments. In other constructions, the slot depth $D_S$ can be less than the maximum height $H_{P1}$.

Figure 11B:
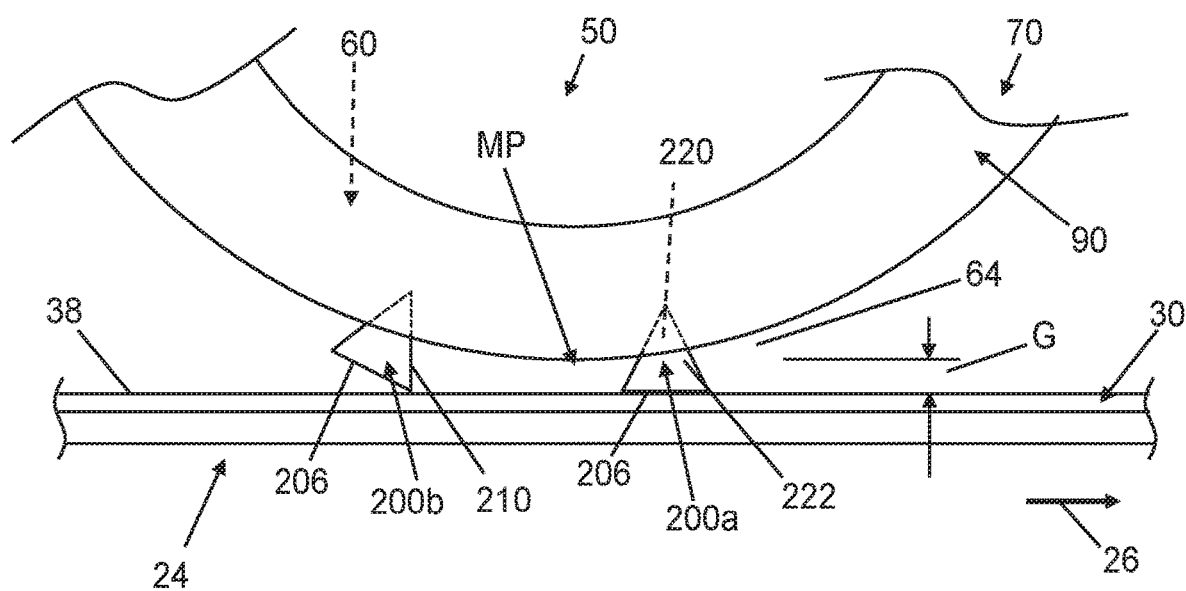
FIG. 11B is a side view of the distribution tool of FIG. 2A interacting with the abrasive particle of FIG. 10A as part of a system for manufacturing abrasive articles.

Dimensions of the abrasive particles 200 can also be utilized to determine a size of the gap G between the lower side 64 of the distribution tool 50 at the mid-point MP and the backing construction web 24 as shown in FIG. 11B. In particular, the gap G is sized so as to ensure that once in contact with the backing construction web 24 near the mid-point MP, a portion of the abrasive particle 200 remains "within" the corresponding slot 60 (referenced generally in FIG. 9B), supported by at least one of the corresponding walls 90. In some embodiments, and with cross-reference between FIGS. 10A and 11B, the size of the gap G at the mid-point MP is 25-75% of the particle maximum height $H_{P1}$. For example, a first abrasive particle 200a is identified in FIG. 11B. The first abrasive particle 200a has achieved the gross biased orientation dictated by the distribution tool 50, fallen along one of the slots 60, and become arranged on the backing construction web 24 (i.e., the first side face 206 bears on or in the major face 38). Because the size of the gap G relative to a location of the abrasive particle 200a is less that the particle maximum height $H_{P1}$, a first portion 220 of the abrasive particle 200a remains within the slot 60, and a second portion 222 is beyond the lower side 64. Thus, the abrasive particle 200a is supported by at least one of the walls 90 (i.e., the first portion 220 contacts at least one of the walls 90) as the abrasive particle 200a traverses along the distribution tool 50 with movement of the backing construction web 24 in the machine direction 26.

Figure 11C:
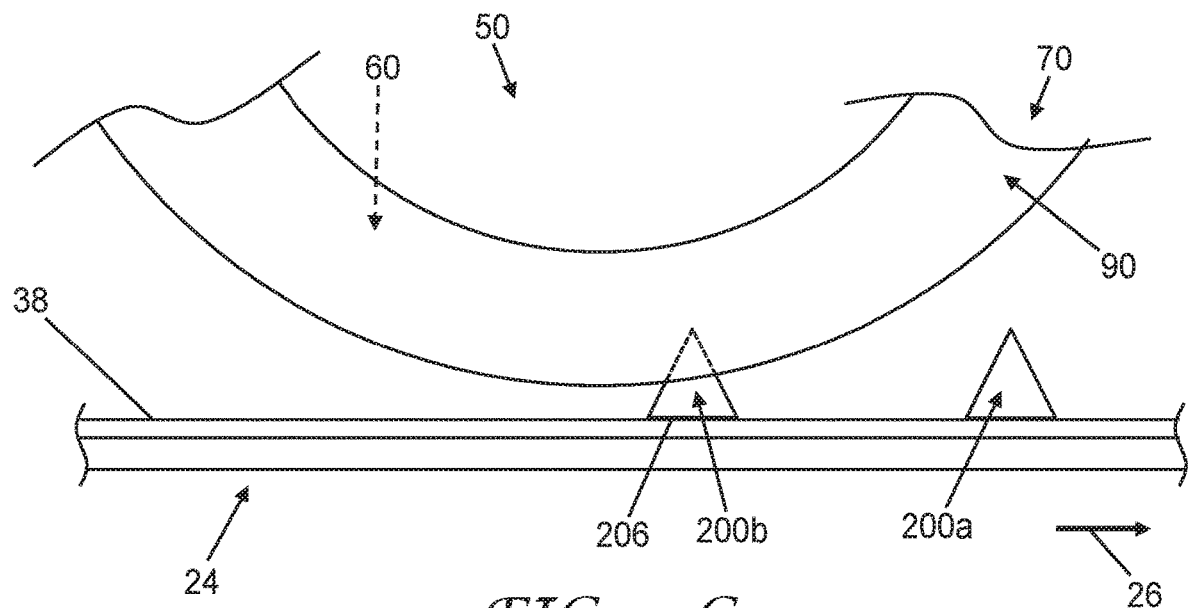
FIG. 11C is the arrangement of FIG. 11B at a later point in time.
Figure 11D:
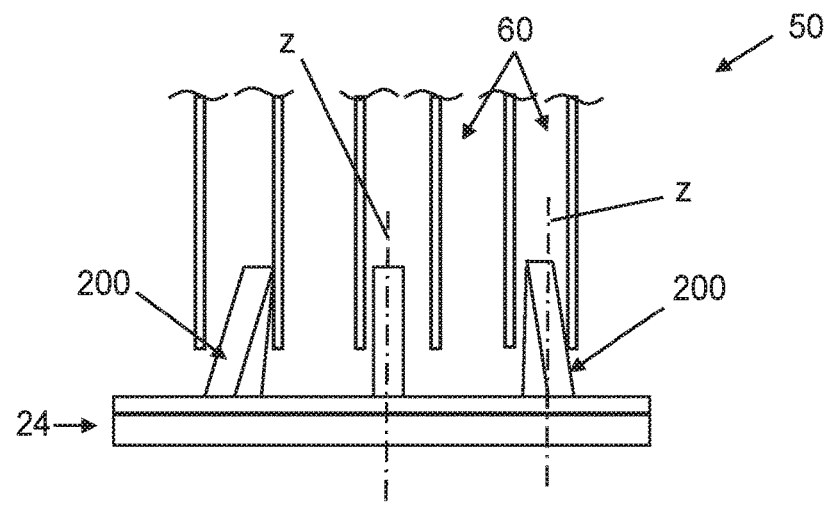
FIG. 11D is an end view of the arrangement of FIG. 11B.

FIG. 11B further reflects that as the abrasive particles 200 initially drop or fall along one of the slots 60, rotational orientation about the particle $X_P$ axis (FIG. 5) is effectively unconstrained, such that the abrasive particle 200 can initially contact the backing construction web 24 at a wide range of particle $X_P$ axis rotational orientations. For example, a second abrasive particle 200b is identified in FIG. 11B as initially contacting the backing construction web 24 at a skewed rotational orientation (i.e., none of the side faces 206-210 are parallel with the major face 38). Once in contact with the backing construction web 24, the abrasive particle 200b will naturally seek a stable orientation as it traverses the distribution tool 50 while being pulled along by the backing construction web 24 in the machine direction 26. This is a "base down" orientation in typically weights of the make coating 30. FIG. 11C represents a later point in time; with movement of the backing construction web 24, the abrasive particle 200b has now naturally attained a stable orientation in which the side face 206 is against or in the major face 38. Commensurate with the above descriptions, in this self-adjusted orientation, a portion of the abrasive particle 200b remains within the slot 60 (referenced generally), supported by at least one of the walls 90. Finally, the end view of FIG. 11D reflects that the gross biased orientation effectuated by the distribution tool 50 limits the z-axis rotational orientation (i.e., the applied particle's 200 angular rotation about a z-axis passing through the particle 200 and through the backing 24 to which the particle 36 is attached at a 90 degree angle to the backing 24) exhibited by each of the attached abrasive particles 200 to a prescribed range, although the z-axis rotational orientations will not be identical for all of the abrasive particles 200.

Figure 12A:
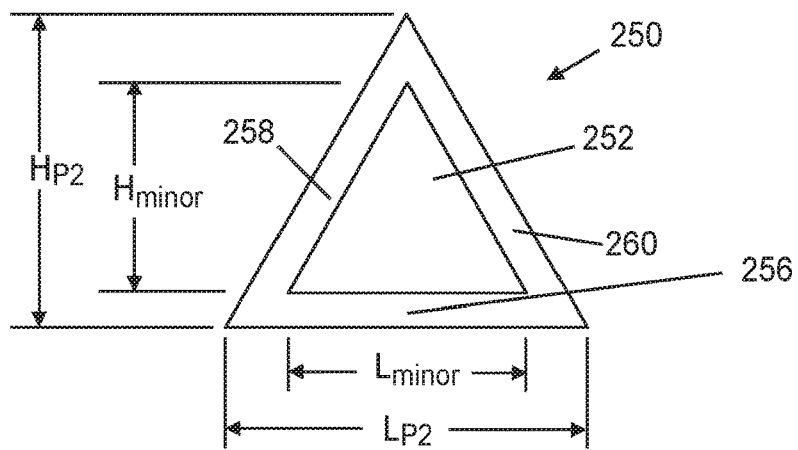
FIG. 12A is a top plan view of another abrasive particle useful with the tools, systems, and methods of the present disclosure.
Figure 12B:
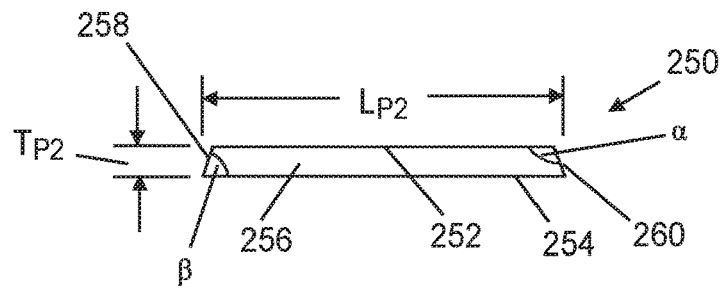
FIG. 12B is an end view of the abrasive particle of FIG. 12A.
Figure 12C:
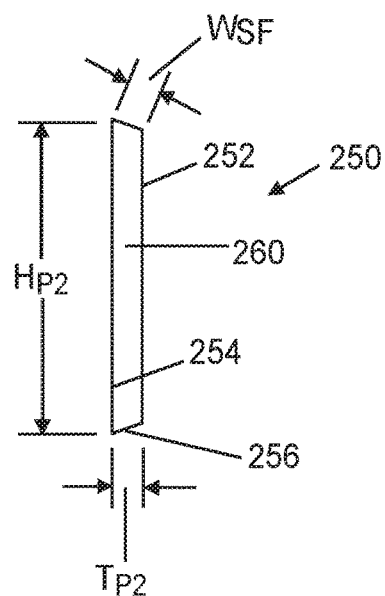
FIG. 12C is a side view of the abrasive particle of FIG. 12A.

A number of other abrasive particle shapes are useful with the distribution tools, systems and methods of the present disclosure. For example, the particle maximum length, height and thickness $L_{P2}$, $H_{P2}$, $T_{P2}$ are designated for another exemplary abrasive particle 250 shape in FIGS. 12A-12C. The shape of the abrasive particle 250 is akin to an equilateral triangular tapered prism in which the particle maximum length $L_{P2}$ is greater than the particle maximum height $H_{P2}$. The tapered geometry across the thickness dictates that dimensions of the abrasive particle 250 at a first major face 252 differ from those at a second, opposing major face 254. As generally reflected by the views, the maximum length $L_{P2}$ and the maximum height $H_{P2}$ are found at the second major face 254; while the first major face 252 has length and height dimensions (labeled as $L_{minor}$, $H_{minor}$), the length and height of the abrasive particle 250 at the first major face 252 are less than those of the second major face 254, with the maximum length and height dimensions $L_{P2}$, $H_{P2}$ existing or being measured at the second major face 254. The maximum thickness $T_{P2}$ is less than the maximum length and height $L_{P2}$, $H_{P2}$. Side faces 256-260 of the abrasive particle 250 have an identical shape and size, and can be characterized as "sloping", defining a draft angle α relative to the first major face 252 and a base angle β relative to the second major face 254. For example, the abrasive particle 250 can assume any of the constructions described in US Publication No. 2010/0151196 entitled "Shaped Abrasive Particle With A Sloping Sidewall" the teachings of which are incorporated herein by reference.

Figure 13A:
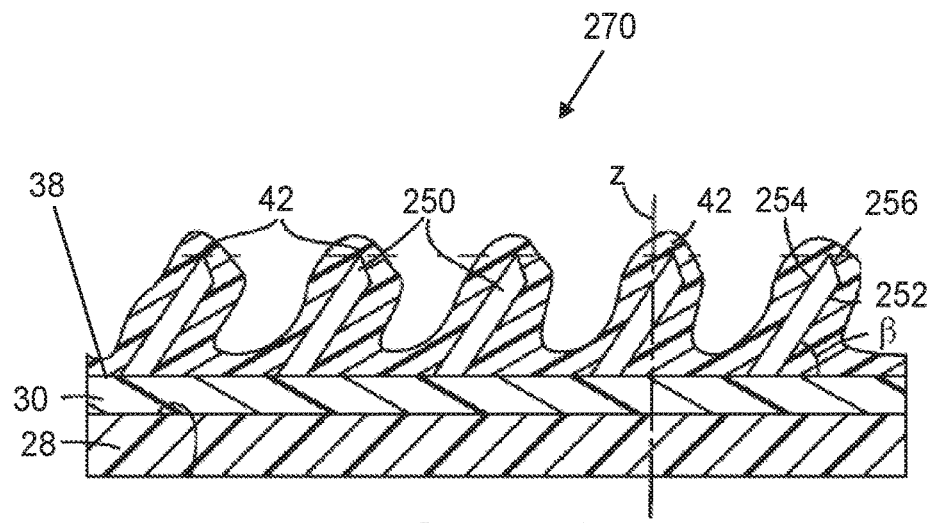
FIG. 13A is a cross-sectional view of an abrasive article including the abrasive particles of FIG. 12A.

An abrasive article manufacturer may prefer that the abrasive particle 250 be applied to and retained at the major face 38 of the backing construction web 24 in an "upright" position as generally reflected by an exemplary coated abrasive article 270 in FIG. 13A (i.e., one of the side faces 256-260 of each of the abrasive particles 250 bears against or is embedded into the backing construction major face 38, with the abrasive particle 250 having an overall "tipped" or "leaning" arrangements and covered with the size coat 42). With additional reference to FIGS. 2A-2C and 12A-12C, the distribution tool 50 can be configured to grossly bias the abrasive particles 250 to the desired upright, tilted orientation by forming the slot width $W_S$ to be less than the particle maximum length and height $L_{P2}$, $H_{P2}$, and greater than the maximum thickness $T_{P2}$ commensurate with the descriptions above. In some embodiments, the slot width $W_S$ is sufficiently large so that the abrasive particles 250 can freely assume the tipped or leaning arrangement, such as by being 25%-75% of the particle maximum height $H_{P2}$.

In other embodiments, the slot width $W_S$ can be more precisely calculated as based on geometry of the abrasive particle 250. With constructions in which the abrasive particle 250 has a uniform equilateral triangular tapered prism shape, the side edge dimensions of the first and second major faces 252, 254 can be measured or are known (and serve as the "length" dimension), as are the draft angle α and the base angle β. Due to the equilateral triangular shape and the known/measured length dimension, the height $H_{minor}$ of the first major face 252 can be calculated as:

$$H_{minor}=3^{1/2}/2\times L_{minor}$$

Alternatively, the height $H_{minor}$ of the first major face 252 can be measured. With the particle thickness $T_{P2}$ being known or measured, a width $W_{SF}$ of any side face 256-260 is then calculated as:

$$W_{SF}=T_{P2}/\sin \beta$$

Figure 13B:
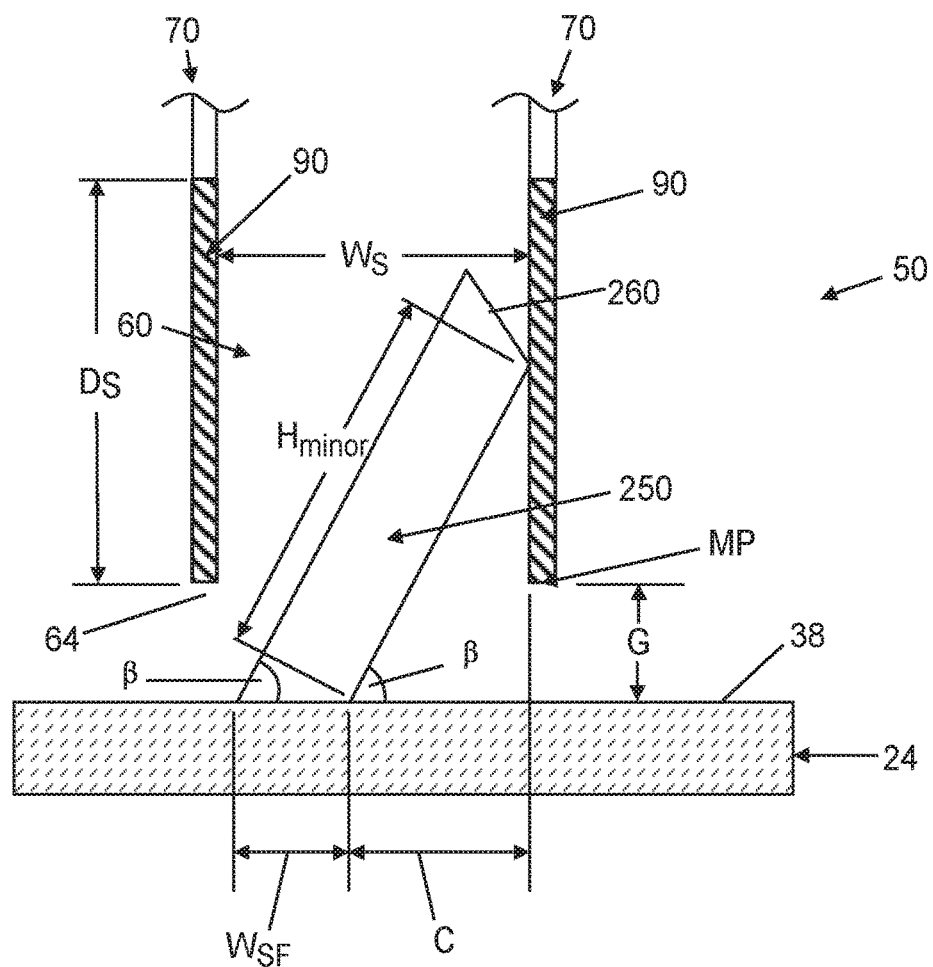
FIG. 13B is an enlarged end view of a portion of the distribution tool of FIG. 2A in applying the abrasive particle of FIG. 12A to a backing.

With reference to FIG. 13B, the slot width $W_S$ can then be determined as a function of the side face width $W_{SF}$. In particular, in order to accommodate the footprint of the abrasive particle 250 in the tipped orientation (in which one of the side faces 256-260 is substantially parallel with the major face 38 of the backing construction web 24 and thus substantially perpendicular to the plane of each of the walls 90), the slot width $W_S$ should be equal to or greater than the side face width $W_{SF}$ plus a clearance dimension (designated as "C" in FIG. 13B). The clearance dimension C can be calculated as:

$$C=H_{minor}\times\cos \beta$$

Thus, the slot width $W_S$ can be calculated as:

$$W_S \geq W_{SF}+C, \text{ or}$$

$$W_S \geq T_{P2}/\sin \beta+(H_{minor}\times\cos \beta)$$

As with previous embodiments, the slot depth $D_S$ is selected to approximate or be greater than the particle maximum height $H_{P2}$ (FIGS. 12A-12C) so as to better ensure that individual ones of the abrasive particles 250 attain the desired gross biased orientation and are supported in this orientation as they traverse the corresponding slot 60. Dimensions of the abrasive particles 250 can also be utilized to determine a size of the gap G between the lower side 64 of the distribution tool 50 and the backing construction web 24 at the mid-point MP. In particular, the gap G is sized so as to ensure that once in contact with the backing construction web 24, a portion of the abrasive particle 250 remains "within" the corresponding slot 60, supported by at least one of the corresponding walls 90. In some embodiments, the size of the gap G at the mid-point MP is 50-75% of the maximum height $H_{P2}$.

Figure 14A:
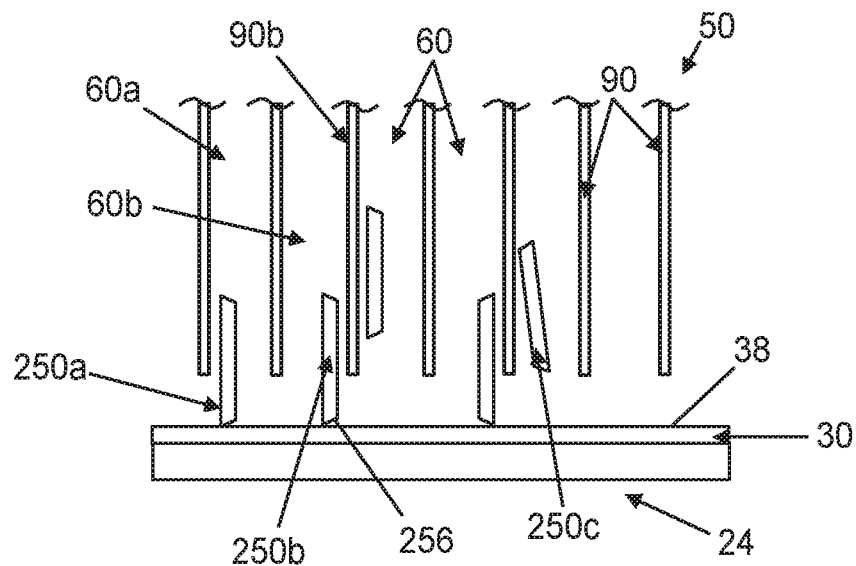
FIGS. 14A and 14B are end views of the distribution tool of FIG. 2A interacting with the abrasive particles of FIG. 12A as part of a system for manufacturing abrasive articles.

Use of the distribution tool 50 in applying a plurality of the abrasive particles 250 is highly akin to the descriptions above. In some embodiments, the distribution tool 50 is configured and arranged so that regardless of the particle $Y_P$, $Z_P$ axes (FIG. 5) rotational orientation of the abrasive particle 250 as it passes along the corresponding slot 60, the abrasive particle 250 is permitted to self-revert toward the "tilted" orientation, with one or more of the walls 90 supporting the abrasive particle 250 in this tilted orientation. For example, the view of FIG. 14A represents various ones of the abrasive particles 250 falling through various ones of the slots 60 at a first point in time. A first one of the abrasive particles 250a is shown has having contacted the major face 38 of the backing construction web 24 at a rotational orientation in which none of the side faces 256-260 are parallel with the major face 38. In other words, while the first abrasive particle 250a has attained the gross biased orientation referenced above sufficient for passing into and partially through the slot 60a, the abrasive particle 250a is not in the desired tilted orientation. Once in contact with the backing construction web 24, the abrasive particle 250a becomes at least partially secured to the make coat 30; however, a surface tension of the make coat 30 and other parameters allow the abrasive particle 250a to naturally tip.

Figure 14B:
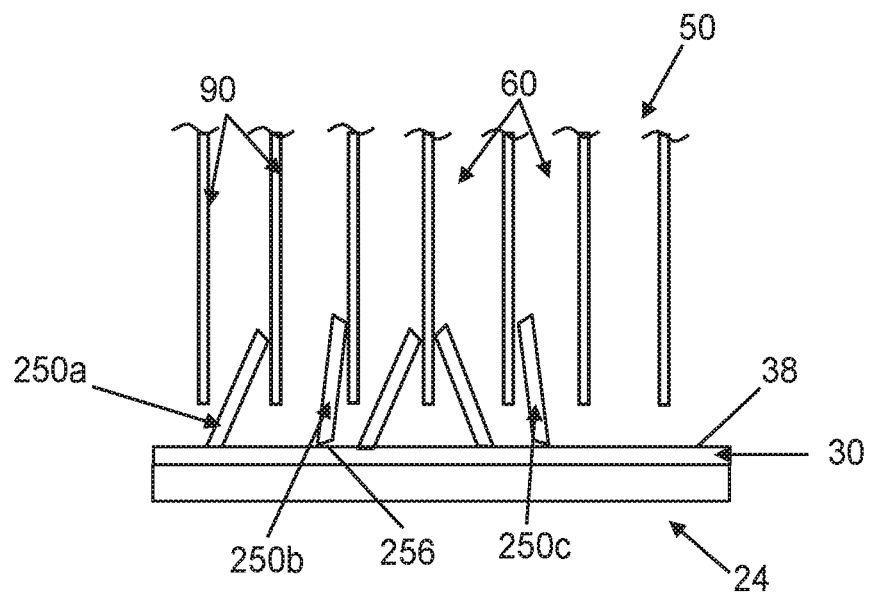

FIG. 14B reflects this phenomena, illustrating the arrangement of FIG. 14A at a later point in time. More particularly, the abrasive particle 250a has self-reverted toward the desired "tipped" orientation, and is supported in this tipped arrangement via contact with one of the walls 90.

As a point of reference, as the abrasive particles 250 randomly fall through the corresponding slots 60, each one of the abrasive particles 250 will not necessarily be spatially located to achieve the final or complete tipped arrangement. For example, a second abrasive particle 250b is identified in FIGS. 14A and 14B. In the state of FIG. 14A, the second abrasive particle 250b is dropping through the slot 60b in relatively close proximity to the wall 90b. The second abrasive particle 250b contacts the major face 38 of the backing construction web 24 (FIG. 14A), and then self-tips to the arrangement of FIG. 14B. As shown, the second abrasive particle 250b comes into contact with the wall 90b prior to achieving the fully tipped arrangement (i.e., the side face 256 is not parallel with the major face 38). However, upon later exiting the distribution tool 50 (i.e., the second abrasive article 250b is no longer in contact with any of the walls 90), the make coat 30 remains sufficiently fluid such that the second abrasive particle 250b is likely to self-transition to the desired tipped arrangement.

FIGS. 14A and 14B also illustrate that with the gross biased orientations dictated by the distribution tools of the present disclosure, the abrasive particles 250 can randomly assume different spatial arrangements within the prescribed particle $Y_P$, $Z_P$ axes ranges. For example, a third abrasive article 250c is identified and is shown as being spatially arranged approximately 180 degrees (about the particle $Z_P$ axis) as compared to the first and second abrasive particles 250a, 250b.

Figure 15A:
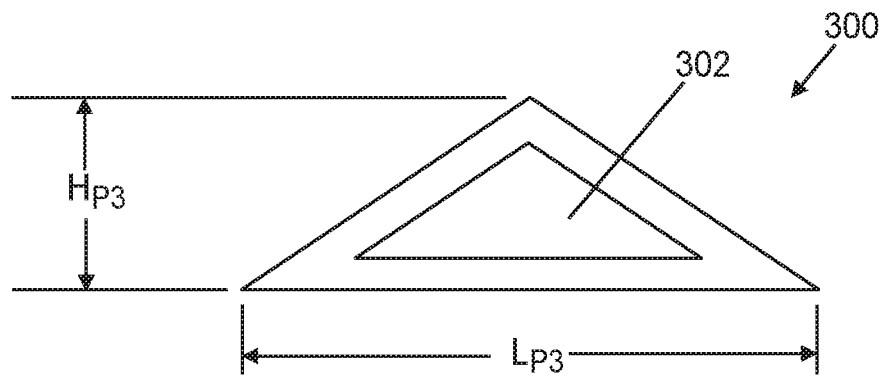
FIG. 15A is a top plan view of another abrasive particle useful with the tools, systems, and methods of the present disclosure.
Figure 15B:
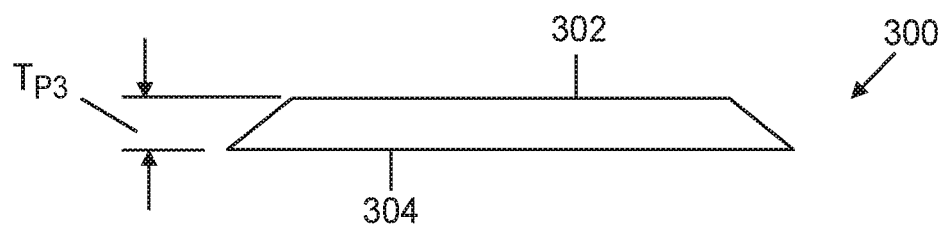
FIG. 15B is an end view of the abrasive particle of FIG. 15A.
Figure 15C:
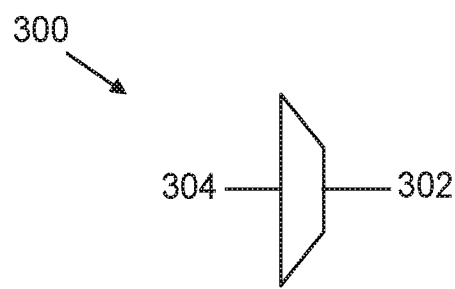
FIG. 15C is a side view of the abrasive particle of FIG. 15A.
Figure 16A:
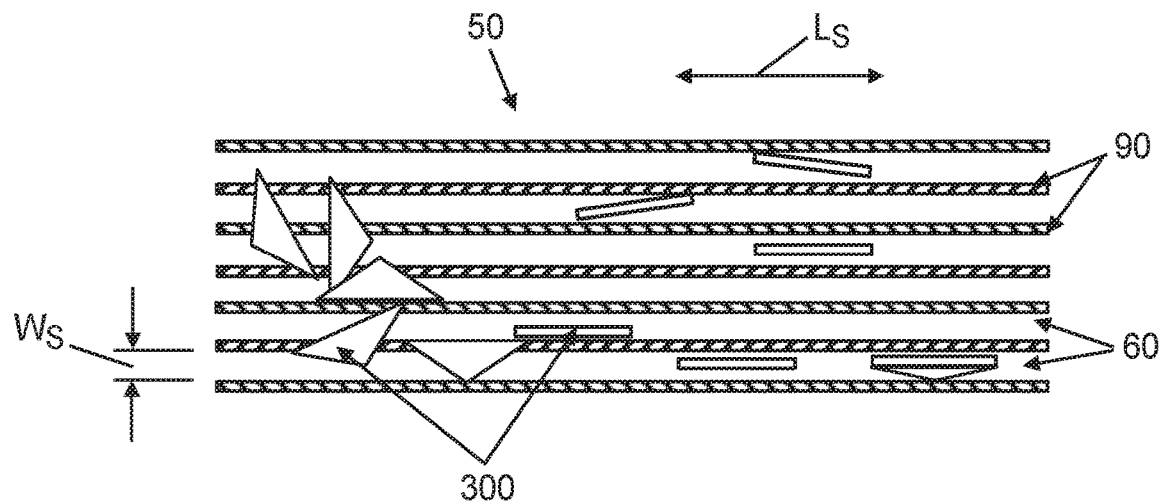
FIGS. 16A and 16B are top views of distribution tools in accordance with principles of the present disclosure interfacing with the abrasive particles of FIG. 15A.
Figure 16B:
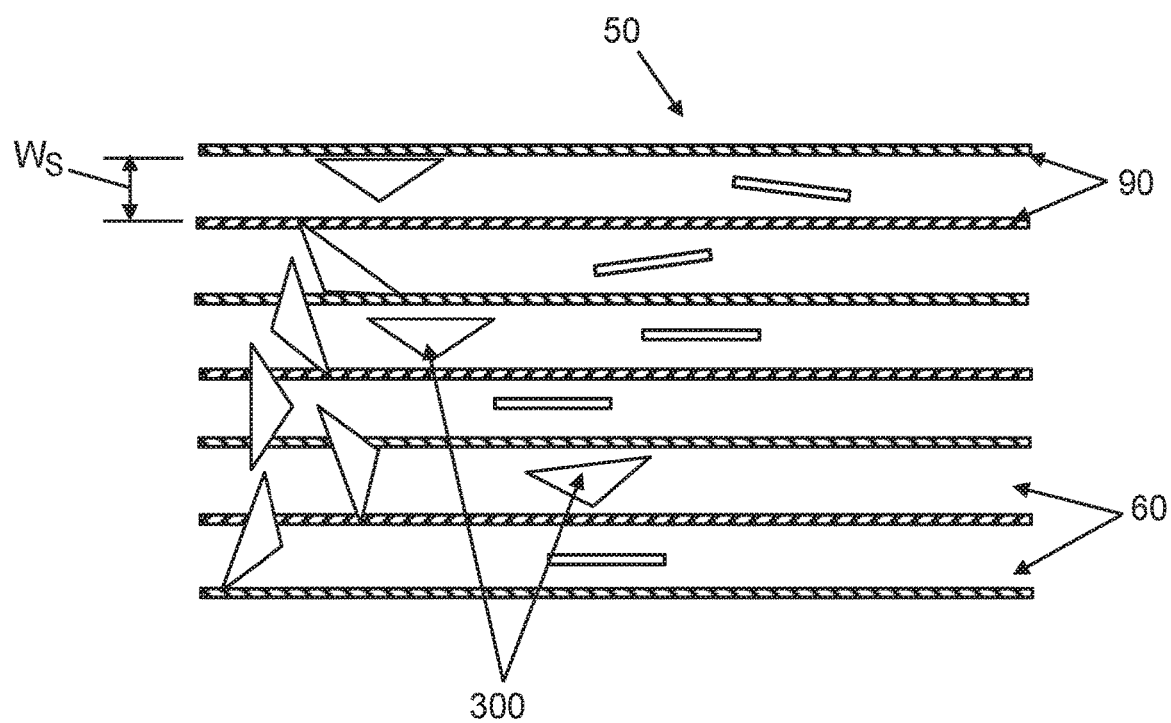

A number of other abrasive particle shapes are equally useful with the present disclosure. By way of further non-limiting example, the particle maximum length, height and thickness $L_{P3}$, $H_{P3}$, $T_{P3}$ are designated for another exemplary abrasive particle 300 shape in FIGS. 15A-15C. The shape of the abrasive particle 300 is akin to an isosceles triangular tapered prism. The maximum length $L_{P3}$ is greater than the maximum height $H_{P3}$. The tapering geometry dictates that the length and height at a first major face 302 differ from an opposing second major face 304, with the maximum length and height $L_{P3}$, $H_{P3}$ being found or measured at the second major face 304 as described above. The maximum thickness $T_{P3}$ is less than the maximum length and height $L_{P3}$, $H_{P3}$. With additional reference to FIGS. 2A-2C and commensurate with the above descriptions, the distribution tool 50 can be configured such that the slot width $W_S$ is less than the particle maximum length $L_{P3}$, optionally less than the particle maximum height $H_{P3}$, but is greater than the particle maximum thickness $T_{P3}$. For example, the view of FIG. 16A illustrates one construction in which the slot width $W_S$ is less than the maximum height $H_{P3}$ (and thus less than the maximum length $L_{P3}$). As a result, the abrasive particles 300 cannot enter any of the slots 60 whenever spatially arranged such that the maximum length $L_{P3}$ or the maximum height $H_{P3}$ is perpendicular to the slot length $L_S$. Alternatively, there may be circumstances where the abrasive article manufacturer is comfortable with a wider range of abrasive particle orientations. Thus, and as reflected by FIG. 16B, the slot width $W_S$ can be selected to be less than the particle maximum length $L_{P3}$ but greater than the particle maximum height $H_{P3}$, permitting the abrasive particles 300 to more readily attain a spatial orientation appropriate for entering one of the slots 60.

As evidenced by the above explanations, the distribution tools of the present disclosure are useful with a plethora of abrasive particle shapes, such as any precision shaped grain currently available or in the future developed. Non-limiting examples of other precision shaped grains or abrasive particles useful with the present disclosure include those described in U.S. Patent Application Publication No. 2009/0169816 entitled "Shaped, Fractured Abrasive Particle, Abrasive Article Using Same and Method of Making"; U.S. Patent Application Publication No. 2010/0146867 entitled "Shaped Abrasive Particles With Grooves"; U.S. Patent Application Publication No. 2010/0319269 entitled "Shaped Abrasive Particles With Low Roundness Factor"; U.S. Patent Application Publication No. 2012/0227333 entitled "Dual Tapered Shaped Abrasive Particles"; U.S. Patent Application Publication No. 2013/0040537 entitled "Ceramic Shaped Abrasive Particles, Methods of Making the Same, and Abrasive Articles Containing the Same"; and U.S. Patent Application Publication No. 2013/0125477 entitled "Intersecting Plate Shaped Abrasive Particles"; the entire teachings of each of which are incorporated herein by reference.

Figure 17A:
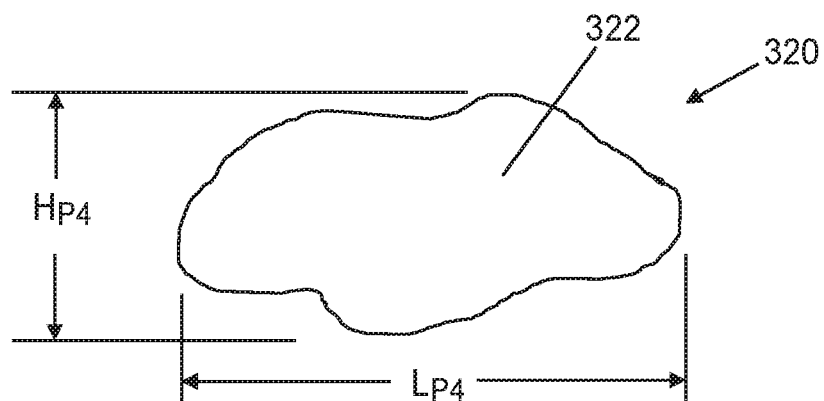
FIG. 17A is a top plan view of another abrasive particle useful with the tools, systems, and methods of the present disclosure.
Figure 17B:
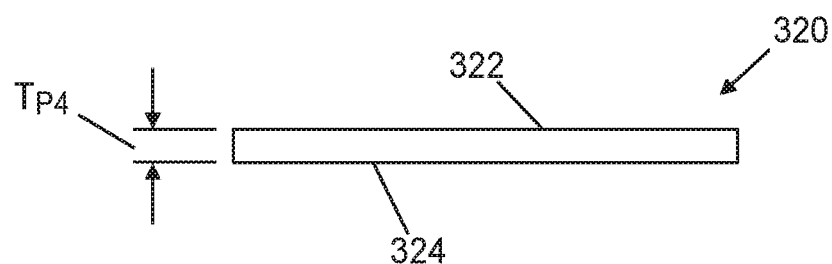
FIG. 17B is an end view of the abrasive particle of FIG. 17A.
Figure 17C:
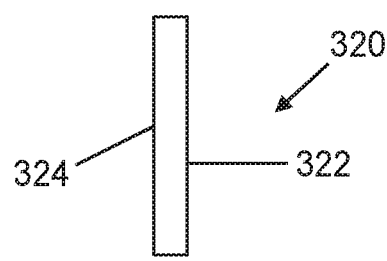
FIG. 17C is a side view of the abrasive particle of FIG. 17A.

In addition, the tools, systems and methods of the present disclosure are also useful with more abstract or complex abrasive particle shapes (e.g., shards, chips, etc.). For example, the particle maximum length, height and thickness $L_{P4}$, $H_{P4}$, $T_{P4}$ are designated for another exemplary abrasive particle 320 shape in FIGS. 17A-17C. The shape of the abrasive particle 320 is akin to a complex prism in which opposing faces 322, 324 have a random, complex shape. The particle maximum length $L_{P4}$ is greater than the particle maximum height $H_{P4}$. The particle maximum thickness $T_{P4}$ is less than the particle maximum length and height $L_{P4}$, $H_{P4}$. With additional reference to FIGS. 2A-2C and commensurate with the above descriptions, the distribution tool 50 can be configured such that the slot width $W_S$ is less than the maximum length $L_{P4}$, optionally less than the maximum height $H_{P4}$, but is greater than the maximum thickness $T_{P4}$.

Regardless of shape, the tools, systems and methods of the present disclosure are useful with a wide range of abrasive particle materials. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. The abrasive particles may be in the form of, for example, individual particles, agglomerates, abrasive composite particles, and mixtures thereof.

Returning to FIG. 1, apart from the distribution tool 50 (and other optional components of the distribution device 22) and use thereof, other features of the abrasive article manufacturing systems and methods of the present disclosure can assume a wide variety of forms as are known in the art.

For example, the backing 28 can be a flexible backing. Suitable flexible backings include polymeric films, metal foils, woven fabrics, knitted fabrics, paper, vulcanized fiber, nonwovens, foams, screens, laminates, and combinations thereof. The coated abrasive articles with a flexible backing may be in the form of sheets, discs, belts, pads, or rolls. In some embodiments, the backing 28 can be sufficiently flexible to allow the coated abrasive article to be formed into a loop to make an abrasive belt that can be run on suitable grinding equipment.

The make coat 30 and, where provided, the size coat 42 comprise a resinous adhesive. The resinous adhesive of the make coat 30 can be the same as or different from that of the size coat 42. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 30 or size coat 42, or both coats, may further comprise additives that are known in the art, such as, for example, fillers, grinding agents, wetting agents, surfactants, dyes, pigments, coupling agents, adhesion promoters, and combinations thereof. Examples of fillers include calcium carbonate, silica, talc, clay, calcium metasailicate, dolomite, aluminum sulfate and combinations thereof.

Figure 18B:
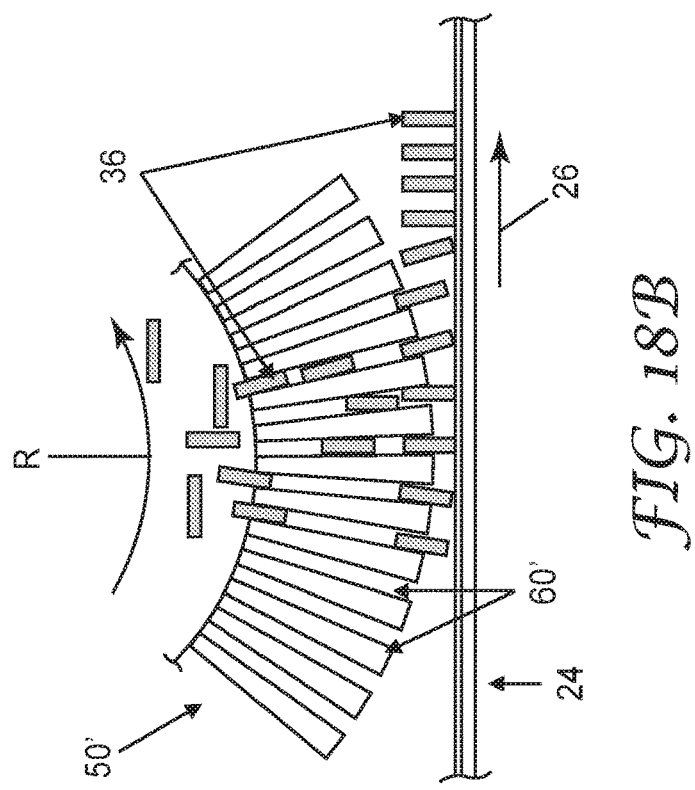
FIG. 18B is a simplified cross-sectional view of a portion of the arrangement of FIG. 18A.
Figure 18A:
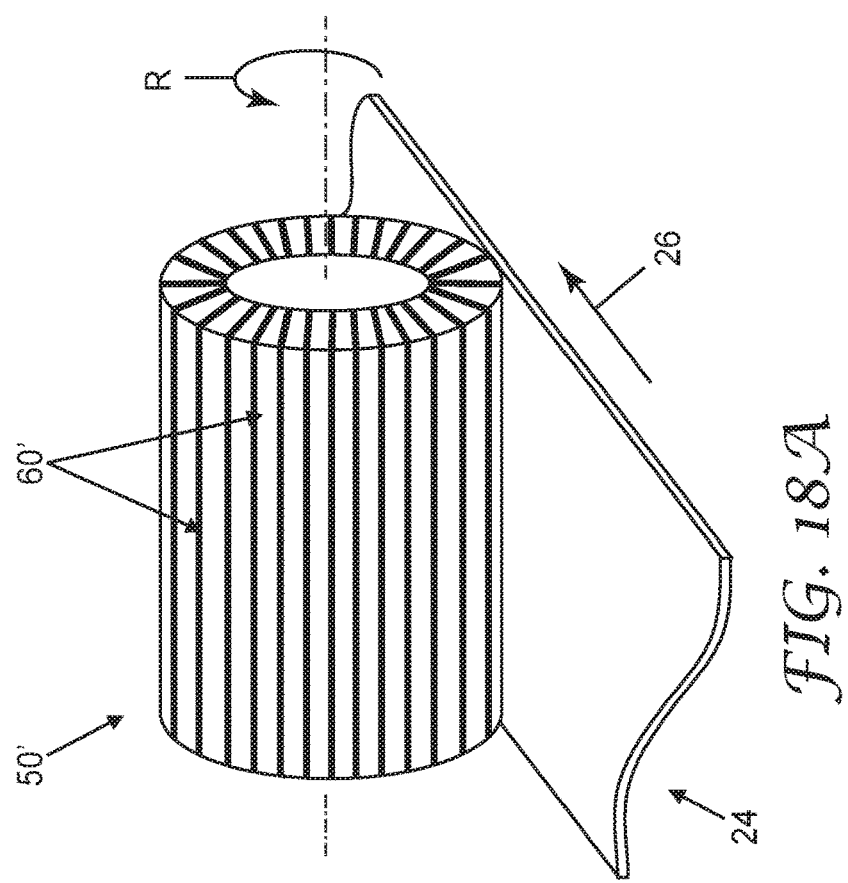
FIG. 18A is a simplified perspective view of another distribution tool in accordance with principles of the present disclosure as part of a system for manufacturing abrasive articles and distributing abrasive particles on to a web.

The distribution tools of the present disclosure are equally useful with other abrasive article manufacturing systems and methods apart from those implicated by FIG. 1. In other embodiments, the distribution tools of the present disclosure can be utilized to apply abrasive particles at a grossly biased orientation that is other than downweb. For example, FIG. 18A illustrates another embodiment distribution tool 50' in accordance with principles of the present disclosure relative to the backing web construction 24. The distribution tool 50' can be highly akin to the descriptions above, having a cylindrical shape and providing or defining a plurality of slots 60'. With the embodiment of FIG. 18A, however, the slots 60' extend in a longitudinal direction of the cylindrical shape (i.e., the length of each slot is substantially parallel with a central axis of the cylindrical shape). Further, the distribution tool 50' is arranged relative to the backing web construction 24 such that the slots 60' are substantially perpendicular (e.g., within 10% of a truly perpendicular arrangement) to the machine direction 26 of the backing web construction 24. During use, and as shown in FIG. 18B, the abrasive particles 36 are grossly biased via passage through a respective one of the slots 60' as described above, and are applied on to the backing web construction 24 in a generally cross-web direction. The rate or speed of the backing web construction 24 in the machine direction 26 can be correlated with the rate or speed of rotation R of the distribution tool 50' can be correlated with one another to better ensure that as the abrasive particles 36 experience minimal interference with the distribution tool 50' once dispensed into contact with the backing web construction 24.

The distribution tools and corresponding abrasive article manufacturing systems and methods of the present disclosure provide a marked improvement over previous designs. Abrasive particles are randomly loaded on to the distribution tool. In passing through the distribution tool and becoming applied to a backing, the abrasive particles are caused to become grossly oriented and aligned, with minimal costs and restrictions on through put time. Further, the distribution tool supports the oriented and aligned abrasive particles for a dwell period, enhancing the likelihood that the abrasive particles will retain the biased orientation. The distribution tools of the present disclosure are useful with any type or shape of abrasive particle, especially abrasive particles that are not well-suited for electrostatic coating.

Although the present disclosure has been described with reference to preferred embodiments, workers skilled in the art will recognize that changes can be made in form and detail without departing from the spirit and scope of the present disclosure. For example, while the various FIGURES have generally reflected application of abrasive particles to an elongated backing construction web moving in a linear machine direction, other constructions and techniques are equally acceptable. In other embodiments, the backing construction web is maintained stationary while the distribution tool is moved relative to the backing construction web. In other embodiments, the backing construction web has a circular or disc shape; with these optional embodiments, the backing construction web is moved in a circular pattern relative to the distribution tool and/or vice-versa.

What is claimed is:

1. A method for making an abrasive article comprising:
   loading abrasive particles to a distribution tool, the distribution tool defining a plurality of slots that are open to an exterior of the distribution tool; and
   distributing abrasive particles from the distribution tool on to a major face of a backing construction web located immediately below the distribution tool, including:
      rotating the distribution tool,
      moving the backing construction web relative to the distribution tool,
      orienting at least first and second of the loaded abrasive particles in a respective one of the slots,
      dispensing the oriented abrasive particles on to the major face,
      wherein during the step of distributing, the first and second oriented abrasive particles are simultaneously at least partially within a first one of the slots and in contact with the major face.

2. The method of claim 1, wherein the first slot is defined by opposing walls, in further wherein at the first point in time, the first and second oriented abrasive particles are both in contact with at least one of the opposing walls.

3. The method of claim 1, wherein at the first point in time, the first oriented abrasive particle is downstream of the second oriented abrasive particle relative to a machine direction of the backing construction web.

4. The method of claim 1, wherein the step of distributing includes, in order:
   i) the first oriented abrasive particle passing partially through the first slot, and in to contact with the major face, followed by
   ii) the second oriented abrasive particle passing partially through the first slot and in to contact with the major face while the first oriented abrasive particle remains partially within the first slot.

5. The method of claim 1, wherein during the step of distributing and at a second point in time after the first point in time, the first oriented abrasive particle is completely outside of the first slot, the second oriented abrasive particle remains at least partially within the first slot, and a third abrasive particle is at least partially within the first slot and is in contact with the major face.

6. The method of claim 1, wherein at the first point in time, third and fourth oriented abrasive particles are both at least partially within a second one of the slots and in contact with the major face.

7. The method of claim 1, wherein at the first point in time, each of the slots simultaneously maintains a respective plurality of the oriented abrasive particles in contact with the major face.

8. The method of claim 1, wherein each of the slots defines a length, a width, and a depth, and further wherein the length is greater than the width and the depth, and even further wherein the length is greater than at least two times the largest nominal dimension of the abrasive particles.

9. The method of claim 8, wherein the length is greater than five times the largest nominal dimension of the abrasive particles.

10. The method of claim 8, wherein the width is smaller than the largest nominal dimension of the abrasive particles.

11. The method of claim 8, wherein the distribution tool is arranged such that a direction of the length of each of the slots is substantially parallel with a machine direction of the moving backing construction web.

\* \* \* \* \*